(12) United States Patent
Takahashi et al.

(10) Patent No.: US 12,362,857 B2
(45) Date of Patent: Jul. 15, 2025

(54) COMMUNICATION DEVICE AND COMMUNICATION SYSTEM

(71) Applicant: Sony Semiconductor Solutions Corporation, Kanagawa (JP)

(72) Inventors: Hiroo Takahashi, Kanagawa (JP); Takashi Sotohebo, Fukuoka (JP); Takayuki Hirama, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 261 days.

(21) Appl. No.: 17/996,116

(22) PCT Filed: Apr. 30, 2021

(86) PCT No.: PCT/JP2021/017291
§ 371 (c)(1),
(2) Date: Oct. 13, 2022

(87) PCT Pub. No.: WO2021/230117
PCT Pub. Date: Nov. 18, 2021

(65) Prior Publication Data
US 2023/0199306 A1    Jun. 22, 2023

(30) Foreign Application Priority Data
May 11, 2020 (JP) ................................ 2020-083304

(51) Int. Cl.
*H04L 1/00* (2006.01)
*G06F 11/10* (2006.01)
*H04N 17/00* (2006.01)

(52) U.S. Cl.
CPC ........ *H04L 1/0061* (2013.01); *G06F 11/1004* (2013.01); *H04N 17/002* (2013.01)

(58) Field of Classification Search
None
See application file for complete search history.

(56) References Cited

U.S. PATENT DOCUMENTS

| 2005/0185461 A1* | 8/2005 | Silverbrook | ........... G06K 19/06 365/185.03 |
| 2009/0316724 A1* | 12/2009 | Muukki | .................. H04L 69/18 370/469 |

(Continued)

FOREIGN PATENT DOCUMENTS

| CN | 110447020 A | 11/2019 |
| CN | 110535762 A | 12/2019 |

(Continued)

OTHER PUBLICATIONS

International Search Report (PCT/ISA/210), International Application No. PCT/JP2021/017291, dated Jun. 29, 2021.

*Primary Examiner* — Mujtaba M Chaudry
(74) *Attorney, Agent, or Firm* — Michael Best & Friedrich LLP

(57) ABSTRACT

Communication devices and systems are disclosed. In one example, a communication device is configured to communicate with a communication partner device in accordance with a protocol including a first operation and a second operation. The first operation includes identification information of the communication partner device, write-instructing information, identification information of a first storage unit of the communication partner device, and data to be written in the first storage unit. The second operation follows the first operation and includes identification information of the communication partner device, write-instructing information, identification information of a second storage unit of the communication partner device, information indicating a number of the protocols, and a cyclic redundancy check (CRC) code used to detect an error in the protocol. The second storage unit is configured to store the CRC code and the information indicating the number of the protocols.

15 Claims, 20 Drawing Sheets

(56) References Cited

U.S. PATENT DOCUMENTS

| | | | | |
|---|---|---|---|---|
| 2015/0100711 A1* | 4/2015 | Sengoku | ............ | G06F 13/4068 |
| | | | | 710/106 |
| 2015/0120975 A1* | 4/2015 | Sengoku | ................ | G06F 13/40 |
| | | | | 710/110 |
| 2015/0248373 A1* | 9/2015 | Sengoku | ............ | G06F 11/3027 |
| | | | | 714/56 |
| 2019/0363829 A1 | 11/2019 | Tune | | |
| 2020/0012615 A1 | 1/2020 | Takahashi | | |

FOREIGN PATENT DOCUMENTS

| | | |
|---|---|---|
| EP | 3573239 A1 | 11/2019 |
| EP | 3605348 A1 | 2/2020 |
| JP | 2002-175269 A | 6/2002 |
| JP | 2011-041107 A | 2/2011 |
| KR | 20190131016 A | 11/2019 |
| KR | 20190134481 A | 12/2019 |
| WO | 2018173796 A1 | 9/2018 |
| WO | WO-2019026642 A1 | 2/2019 |

\* cited by examiner

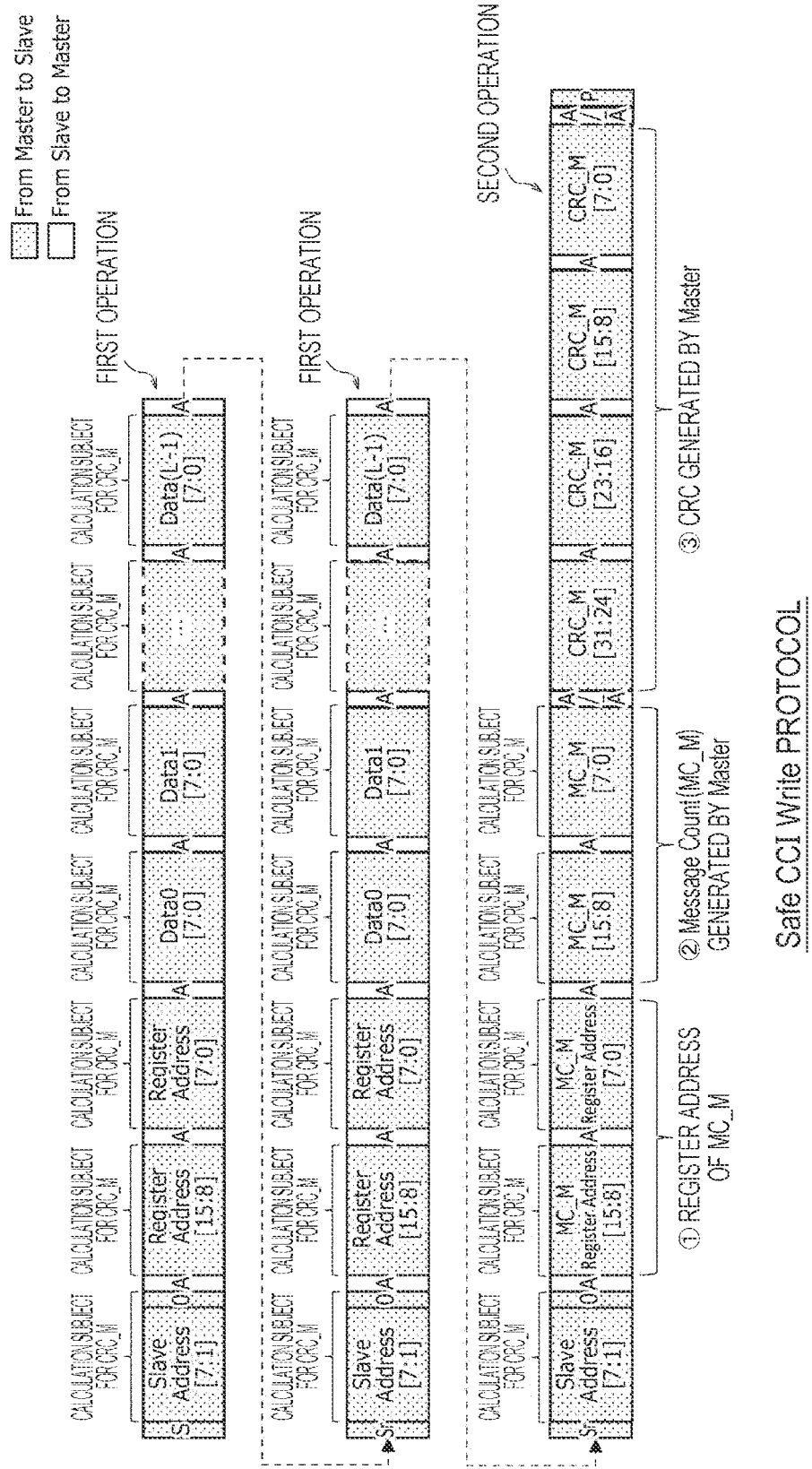

WAVEFORM FOR START FLAG OR RESTART FLAG

WAVEFORM FOR STOP FLAG

SPECIFIC EXAMPLE OF Safe CCI Write PROTOCOL

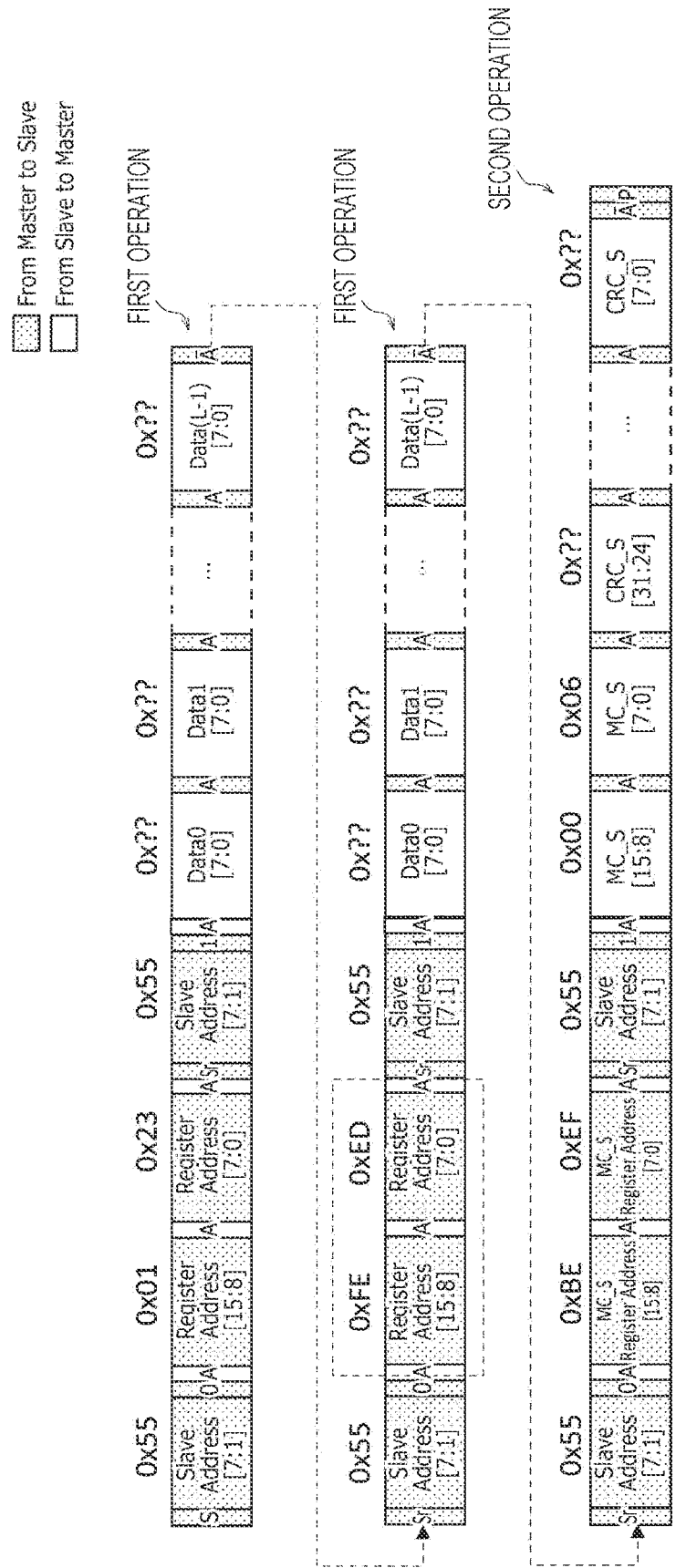

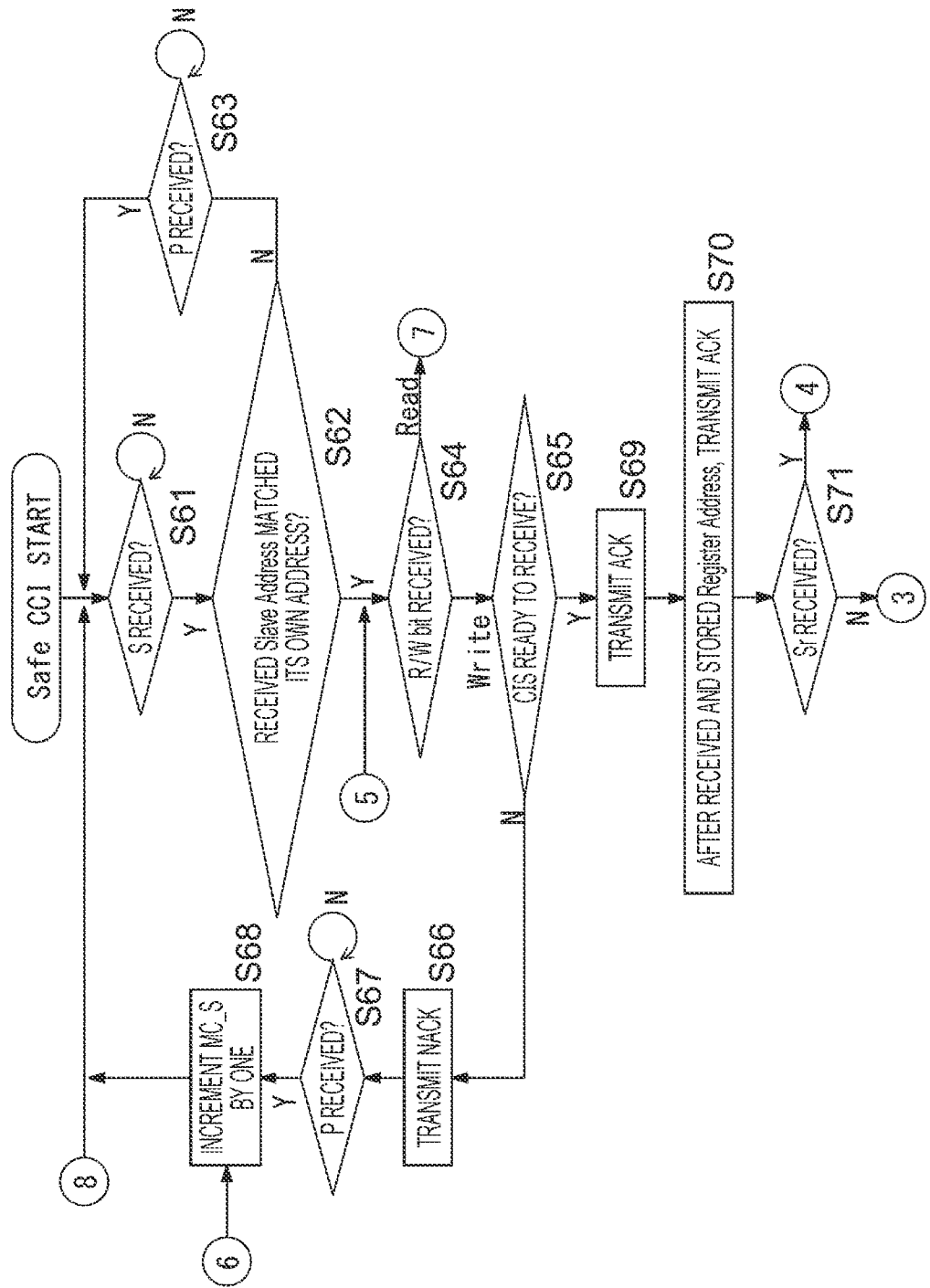

COMMUNICATION DEVICE AND COMMUNICATION SYSTEM

TECHNICAL FIELD

The present disclosure relates to a communication device and a communication system.

BACKGROUND ART

Automated driving needs a high-speed image data transmission technique for its practical use. In this case, the image data is captured with an in-vehicle camera. The in-vehicle camera is often controlled using the camera control interface (CCI) (see Patent Document 1).

CITATION LIST

Patent Document

Patent Document 1: Japanese Patent Application Laid-Open No. 2002-175269

SUMMARY OF THE INVENTION

Problems to be Solved by the Invention

The CCI, however, originally developed for the mobile market, is not provided with a transmission error detection function. A solution is conceivable to apply a protocol with a cyclic redundancy check (CRC) code attached to an operation (packet) transmitted or received via the CCI, but this makes it incompatible with existing operations transmitted or received via the CCI. In one example, attaching a CRC code to the tail end of the operation transmitted by a host device to an image sensor may cause the image sensor to misrecognize the attached CRC code as register write data. This erroneous recognition may cause abnormal error detection or writing inaccurate data to a register, which leads to malfunction or even abnormal stop of an image sensor.

Thus, the present disclosure provides a communication device and a communication system capable of detecting an error in the operation error without causing a malfunction in the operation.

Solutions to Problems

In order to solve the above issues, according to the present disclosure, there is provided a communication device including:

a communication unit configured to communicate with a communication partner device in accordance with a protocol, in which the protocol has at least one first operation and a second operation, the first operation includes identification information of the communication partner device, write-instructing information, identification information of a first storage unit of the communication partner device, and data to be written in the first storage unit, and the second operation is placed following the at least one first operation and includes identification information of the communication partner device, write-instructing information, identification information of a second storage unit of the communication partner device, information indicating a number of the protocols, and a cyclic redundancy check (CRC) code used to detect an error in the protocol, the second storage unit being configured to store the CRC code and the information indicating the number of the protocols.

The identification information of the communication partner device included in the first operation may be identical to the identification information of the communication partner device included in the second operation.

The data to be written to the first storage unit in the first operation may have a head position equal to a head position of the information indicating the number of the protocols in the second operation, and the CRC code may be placed following the information indicating the number of the protocols.

A counter configured to count the number of the protocols to be transmitted to the communication partner device; and a CRC code generation unit configured to generate the CRC code on the basis of the respective pieces of information included in the at least one first operation and the respective pieces of information placed preceding the CRC code in the second operation may further be included.

The protocol may include a start flag placed at a beginning position of the leading first operation, a restart flag placed at a beginning position of the subsequent first operations, a restart flag placed at a beginning position of the second operation, and a stop flag placed at a tail end of the second operation.

A retransmission processing unit configured to perform processing of receiving an acknowledgment signal or a signal of logical inversion to the acknowledgment signal, transmitting a stop flag, and retransmitting the protocol from a head position of the protocol, in which the acknowledgment signal or the logical inversion signal is received from the communication partner device each time the respective pieces of information in the first operation and the second operation are transmitted to the communication partner device, the stop flag is transmitted to the communication partner device in a case of receiving the logical inversion signal, and the retransmission is performed after incrementing the information indicating the number of the protocols, may further be included.

A retransmission processing unit configured to perform processing of receiving an acknowledgment signal or a signal of logical inversion to the acknowledgment signal and retransmitting the protocol from a head position of the protocol, in which the acknowledgment signal or the logical inversion signal is received from the communication partner device each time the respective pieces of information in the first operation and the second operation are transmitted to the communication partner device, and the retransmission is performed after incrementing the information indicating the number of the protocols in a case of receiving the logical inversion signal, may be included.

A first error handling unit configured to initialize the information indicating the number of the protocols and instruct the communication partner device to initialize the information indicating the number of the protocols and an error flag held by the communication partner device in a case of receiving a signal of logical inversion to an acknowledgment signal from the communication partner device after transmission of the information indicating the number of the protocols in the second operation, the number of the protocols being counted by the communication partner device, and a second error handling unit configured to initialize the information indicating the number of the protocols and instruct the communication partner device to initialize the information indicating the number of the protocols and the error flag held by the communication partner device in a case of receiving the signal of logical inversion to the acknowledgment signal from the communication partner device after transmission of the CRC code in the second operation, the number of the protocols being counted by the communication partner device may further be included.

The communication partner device may be an image capturing device, and the first operation of the protocol may include data used to control the image capturing device.

According to the present disclosure, there is provided a communication device including:

a communication unit configured to communicate with a communication partner device in accordance with a protocol including at least one first operation and a second operation;

a first storage unit configured to store data included in the first operation;

a second storage unit configured to store information indicating a number of the protocols included in the second operation and a first CRC code used to detect an error in the protocol;

a counter configured to count the number of the protocols received by the communication unit;

a CRC code generation unit configured to generate a second CRC code on the basis of respective pieces of information in the first operation and the second operation placed preceding the first CRC code in the protocol received by the communication unit;

a first comparator configured to compare the information indicating the number of the protocols included in the second operation with the number of the protocols counted by the counter;

a second comparator configured to compare the first CRC code with the second CRC code;

a first error detection unit configured to output a first error detection signal in a case of no match of results obtained by comparison in the first comparator; and a second error detection unit configured to output a second error detection signal in a case of no match of results obtained by comparison in the second comparator.

A write processing unit configured to control the first storage unit in such a way the first storage unit stores the data included in the first operation in a case where the first operation includes identification information of the communication device, the first operation includes identification information of the first storage unit, and the first operation includes write-instructing information, in which the write processing unit controls the second storage unit in such a way that the second storage unit stores the information indicating the number of the protocols and the first CRC code, which are included in the second operation, in a case where the second operation includes identification information of the second storage unit, may further be included.

A third storage unit configured to store the number counted by the counter and the second CRC code generated by the CRC code generation unit, and a read processing unit configured to perform control of transmitting via the communication unit the number counted by the counter and the second CRC code generated by the CRC code generation unit, which are stored in the third storage unit, in a case of including read-instructing information in the second operation in the protocol and including identification information of the third storage unit in the second operation, may further be included.

An image capturing unit configured to output an image signal may further be included, and the communication partner device may be a control device that controls the image capturing unit and performs image processing on the image signal.

According to the present disclosure, there is provided a communication device including:

a communication unit configured to communicate with a communication partner device in accordance with a protocol including read-requesting information, in which the protocol has at least one first operation and a second operation, the first operation includes first read-requesting information and information read from a first storage unit included in the communication partner device in response to the first read-requesting information and transmitted from the communication partner device, the first read-requesting information includes identification information of the communication partner device, write-instructing information, identification information of the first storage unit, the identification of the communication partner device, and read-instructing information, the second operation includes second read-requesting information and information read from a second storage unit in response to the second read-requesting information and transmitted from the communication partner device, and the second read-requesting information includes the identification information of the communication partner device, the write-instructing information, identification information of the second storage unit, the identification information of the communication partner device, the read-instructing information, the second storage unit being configured to store information indicating a number of the protocols counted by the communication partner device and a CRC code used to detect an error of the protocol, the CRC code being generated by the communication partner device.

The identification information of the communication partner device included in the first operation may be identical to the identification information of the communication partner device included in the second operation.

The protocol may include a start flag placed at a beginning position of the leading first operation, a restart flag placed at a beginning position of the subsequent first operations, a restart flag placed at a beginning position of the second operation, and a stop flag placed at a tail end of the second operation.

A counter configured to count the number of the protocols transmitted to the communication partner device;

a CRC code generation unit configured to generate a CRC code on the basis of respective pieces of information included in the respective protocols transmitted to the communication partner device;

a first comparator configured to compare the information indicating the number of the protocols transmitted from the communication partner device with the number counted by the counter;

a second comparator configured to compare the CRC code transmitted from the communication partner device with the CRC code generated by the CRC code generation unit; and an error handling unit configured to perform error handling in a case of no match of results obtained by comparison in at least one of the first comparator or the second comparator may further be included.

The error handling unit may initialize a count value of the counter and instruct the communication partner device to clear the information indicating the number of the protocols being counted by the communication partner device and an error detection flag to zero.

A retransmission processing unit configured to perform retransmission processing of the protocol after counting up the number of the protocols counted by the counter in a case of receiving a signal of logical inversion to an acknowledgment signal from the communication partner device, the retransmission being performed in at least one of a case of transmitting the identification information of the communication partner device included in the first operation, a case of transmitting the identification information of the first storage unit included in the first operation, a case of transmitting the identification information of the communication partner device included in the first operation or the second operation after transmission of the restart flag to the communication partner device, or a case of transmitting the identification information of the second storage unit in the second operation may further be included.

According to the present disclosure, there is provided a communication system including:

a first communication device; and a second communication device, in which the first communication device has a first communication unit configured to communicate with the second communication device in accordance with a first protocol, the first protocol includes at least one first operation and a second operation, the first operation includes identification information of the second communication device, identification information of a first storage unit included in the second communication device, and data to be written in the first storage unit, the second operation is placed following the at least one first operation and includes the identification information of the second communication device, identification information of a second storage unit included in the second communication device, information indicating a number of the first protocols, and a cyclic redundancy check (CRC) code used to detect an error in the first protocol, the second storage unit being configured to store the CRC code and the information indicating the number of the first protocols, in which the second communication device has a second communication unit configured to communicate with the first communication device in accordance with the first protocol;

a first storage unit configured to store data included in the first operation;

a second storage unit configured to store the information indicating the number of the first protocols included in the second operation and a first CRC code used to detect the error in the first protocol;

a counter configured to count the number of the first protocols received by the second communication unit;

a CRC code generation unit configured to generate a second CRC code on the basis of respective pieces of information in the first operation and the second operation placed preceding the first CRC code in the first protocol received by the second communication unit;

a first comparator configured to compare the information indicating the number of the first protocols included in the second operation with the number counted by the counter;

a second comparator configured to compare the first CRC code with the second CRC code;

a first error detection unit configured to output a first error detection signal in a case of no match of results obtained by comparison in the first comparator; and a second error detection unit configured to output a second error detection signal in a case of no match of results obtained by comparison in the second comparator.

The first communication device may transmit a second protocol including read-requesting information to the second communication device, the second communication device may have a third storage unit configured to store the number counted by the counter and the second CRC code generated by the CRC code generation unit, the second protocol may have at least one third operation and a fourth operation, the third operation may include first read-requesting information and information read from the first storage unit in response to the first read-requesting information and transmitted from the second communication device, the first read-requesting information may include identification information of the second communication device, write-instructing information, identification information of the first storage unit included in the second communication device, the identification information of the second communication device, and read-instructing information, the fourth operation may include second read-requesting information and information read from the third storage unit in response to the second read-requesting information and transmitted from the second communication device, and the second read-requesting information may include the identification information of the second communication device, the write-instructing information, identification information of the third storage unit, the identification information of the second communication device, and the read-instructing information.

A third communication device configured to perform serial communication with the first communication device; and a fourth communication device configured to perform serial communication with the second communication device and perform serial communication with the third communication device are further included, in which the third communication device and the fourth communication device may relay the first protocol and the second protocol.

The first communication device and the third communication device may perform inter-integrated circuit (I2C) or improved inter-integrated circuit (I3C) communication, and the second communication device and the fourth communication device may perform I2C or I3C communication.

BRIEF DESCRIPTION OF DRAWINGS

FIG. 5 is a diagram illustrating an example of a CCI-compliant write protocol in the present embodiment.

FIG. 9 is a diagram illustrating a specific example of a read protocol.

FIG. 12A is a flowchart illustrating a processing procedure in an image sensor.

MODE FOR CARRYING OUT THE INVENTION

Embodiments of a communication device and a communication system are now described with reference to the drawings. The key constitutional components of the communication device and the communication system are now mainly described, but the communication device and the communication system can have other components and functions than illustrated or described. The description herein is not intended to exclude components or functions not illustrated or described.

Figure 1:
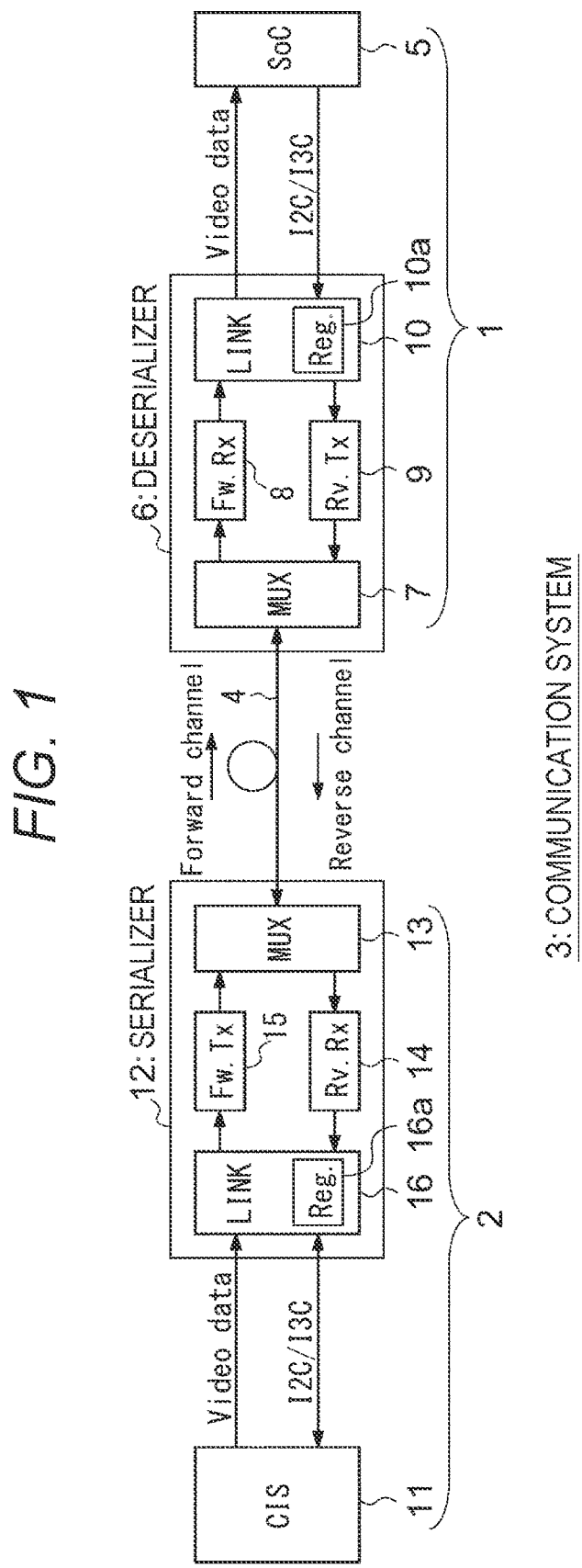
FIG. 1 is a block diagram illustrating a schematic configuration of a communication system 3 including a master and a slave according to an embodiment.

FIG. 1 is a block diagram illustrating a schematic configuration of a communication system 3 including a master 1 and a slave 2 according to an embodiment. FIG. 1 illustrates the flow of signals upon transmission of a video signal from the slave 2 to the master 1 with an arrow, but the same is true for the transmission of the video signal from the master 1 to the slave 2. Herein, one of the master 1 or the slave 2 can be referred to as a communication device or a first communication device, and the other can be referred to as a communication partner device or a second communication device.

In FIG. 1, the master 1 is connected to the slave 2 via one cable 4, which allows bi-directional signal transmission. More specifically, the master 1 and the slave 2 perform bi-directional signal transmission using time-division duplexing (TDD) or frequency division duplexing (FDD) techniques. In FIG. 1, the signal transmission from the master 1 to the slave 2 is referred to as a reverse channel, and the signal transmission from the slave 2 to the master 1 is referred to as a forward channel.

The master 1 has a system-on-chip (SoC) 5 and a deserializer 6. The SoC 5 receives a video signal or the like transmitted from the deserializer 6. The SoC 5 also receives or transmits a control signal or the like from or to the deserializer 6. The transmission and reception of control signals or the like between the SoC 5 and the deserializer 6 are performed using, for example, inter-integrated circuit (I2C) or improved inter-integrated circuit (I3C) communication.

The deserializer 6 converts a video signal or the like transmitted from a serializer 12 included in the slave 2 into a parallel signal for transmission to the SoC 5. The deserializer 6 also receives the control signal transmitted from the SoC 5 for transmission to the serializer 12. The deserializer 6 communicates with the serializer 12 using bi-directional serial communication. The bidirectional serial communication has asymmetric rates. For example, the transmission rate from the serializer 12 to the deserializer 6 is faster than that from the deserializer 6 to the serializer 12.

The deserializer 6 has a first MUX 7, a first receiver (Fw. Rx) 8, a first transmitter (Rv. Tx) 9, and a first LINK unit 10.

The first MUX 7 performs switching of a serial signal received via the cable 4 from the slave 2 and a serial signal output from the first transmitter 9 according to the time allocation during a TDD cycle, or subjects the signal to FDD transmission over a different frequency channel.

The first receiver 8 receives the serial signal (or multi-valued signal) transmitted via the cable 4 from the serializer 12, subjects the signal to equalization processing and error detection or error correction processing as necessary, and then converts the resultant signal into a parallel signal. The first transmitter 9 converts the parallel signal into a serial signal and supplies the converted signal to the first MUX 7.

The first LINK unit 10 performs transmission processing of a signal to be transmitted that is output from the SoC 5 to the first transmitter 9 and transmission processing of a decoded signal output from the first receiver 8 to the SoC 5 in the switching depending on time.

The slave 2 has an image sensor 11 and the serializer 12. The image sensor 11 outputs a parallel signal including a video signal or the like. The image sensor 11 also transmits and receives a control signal to and from the serializer 12. The transmission or reception of the control signal between the image sensor 11 and the serializer 12 is performed using, for example, I2C or I3C communication. The image sensor 11 can be referred to as a CMOS image sensor (CIS) herein and in the drawings.

The serializer 12 has a second MUX 13, a second receiver 14 (Rv. Rx) 14, a second transmitter (Fw. Tx) 15, and a second LINK unit 16.

The second MUX 13 performs switching of a serial signal received via the cable 4 from the master 1 and a serial signal output from the second transmitter 15 according to the time allocation during a TDD cycle, or subjects the signal to FDD transmission over a different frequency channel.

The second receiver 14 receives the serial signal (or multi-valued signal) transmitted via the cable 4 from the deserializer 6, subjects the signal to equalization processing and error detection or error correction processing as necessary, and then converts the resultant signal into a parallel signal. The second transmitter 15 converts the parallel signal into a serial signal and supplies the converted signal to the second MUX 13.

The second LINK unit 16 performs transmission processing of a signal to be transmitted that is output from the image sensor 11 to the second transmitter 15 and transmission processing of a decoded signal output from the second receiver 14 to the image sensor 11 in the switching depending on time.

The SoC 5 functions as a communication control unit that controls the deserializer 6. More specifically, the SoC 5 is capable of changing the signal ratio in the downlink direction toward the slave 2 (first direction) and the signal ratio in the uplink direction coming from the slave 2 (second direction) depending on the signal transmission condition with the slave 2. The SoC 5 transmits the changed signal ratio to the deserializer 6. The deserializer 6 stores its signal ratio, which is to be used, in a storage unit 10a and transmits a signal, which includes the signal ratio to be used by the slave 2, via the cable 4 to the slave 2. The slave 2 stores the received signal ratio in, for example, a storage unit 16a in the serializer 12. The storage units 10a and 16a can be, for example, a register or semiconductor memory.

Figure 2:
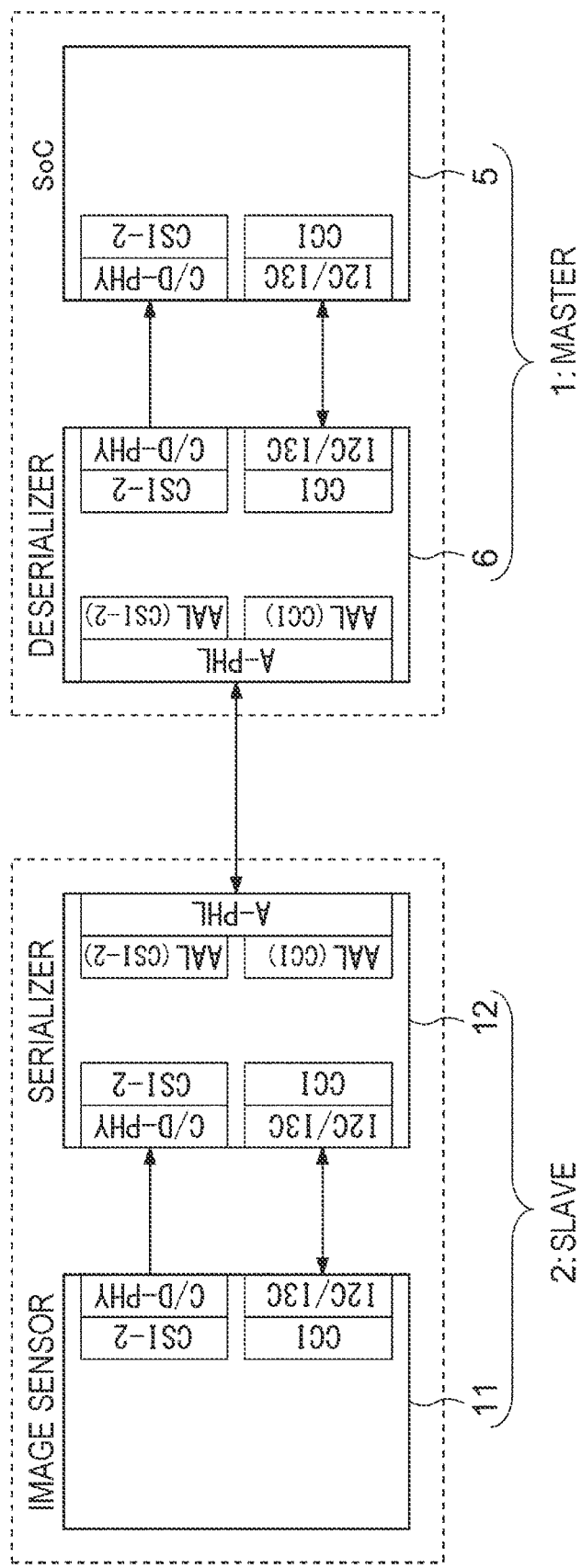
FIG. 2 is a diagram illustrating a communication standard or the like employed by a communication system.

FIG. 2 is a diagram illustrating an example of a communication standard or the like employed by the SoC 5 and the deserializer 6, which are included in the master 1 and a communication standard or the like employed by the image sensor 11 and the serializer 12, which are included in the slave 2. As illustrated in FIG. 2, between the SoC 5 and the deserializer 6, the video signal transmission or reception is performed using camera serial interface 2 (CSI-2) and C-PHY or D-PHY, which is the mobile industry processor interface (MIPI) physical layer specification. Between the SoC 5 and the deserializer 6, the transmission or reception of a protocol for the CCI is also performed using I2C or I3C communication.

Similarly, between the image sensor 11 and the serializer 12 in the slave 2, the video signal transmission or reception is performed using CSI-2 and C-PHY or D-PHY. In addition, between the image sensor 11 and the serializer 12, the transmission or reception of a protocol for the CCI is performed using I2C or I3C communication.

On the other hand, between the serializer 12 and the deserializer 6, the serial communication is performed using A-PHY and (A-PHY adaptation layer (AAL). Moreover, other specifications than the communication specifications illustrated in FIG. 2 can be used.

Figure 3:
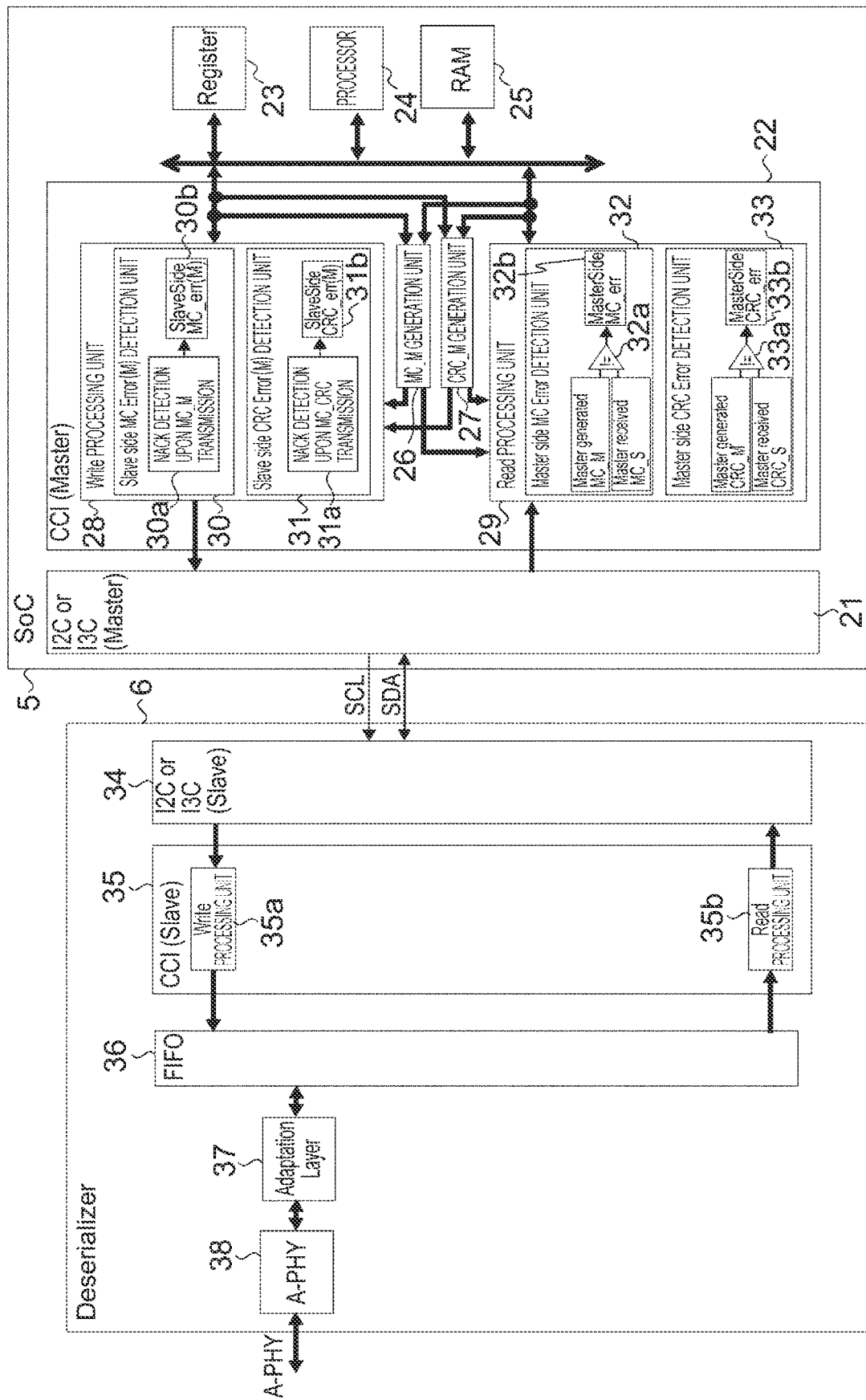
FIG. 3 is a block diagram illustrating an internal configuration of an SoC and a deserializer 6 in a master.

FIG. 3 is a block diagram illustrating an internal configuration of an SoC 5 and a deserializer 6 in a master 1. The block diagram in FIG. 3 illustrates a block configuration relating to the protocol for the CCI, while the other components are omitted. The deserializer 6 receives the protocol transmitted from the SoC 5 and transmits it to the serializer 12 in the slave 2. The deserializer 6 communicates with the serializer 12 with serial transmission.

The SoC 5 has a communication unit 21, a CCI unit 22, a register group 23, a processor 24, and a RAM 25. The communication unit 21 allows the SoC 5 to communicate with the deserializer 6 through I2C or I3C communication. The SoC 5 transmits and receives various information items to and from the image sensor 11 in the slave 2, so the communication unit 21 communicates with the slave 2 in accordance with a protocol described later. Moreover, the block configuration of the SoC 5 in FIG. 3 illustrates only those relating to I2C or I3C communication.

The CCI unit 22 has an MC_M generation unit (a message counter) 26, a CRC_M generation unit (a CRC code generation unit) 27, a write processing unit 28, and a read processing unit 29.

The MC_M generation unit 26 counts the number of protocols that the SoC 5 transmits to the slave 2. In the SoC 5, a count value of the MC_M generation unit 26 is herein referred to as a message count value MC_M. The protocol includes a plurality of operations from the transmission of a start flag to the transmission of a stop flag, as described later. Each operation is a collection of multiple pieces of bit string information in units of eight bits. The operation of typical writing to the slave 2 is herein referred to as a first operation. The operation of writing a message count value MC_M and a CRC code CRC_M to the slave 2 is herein referred to as a second operation.

The CRC_M generation unit 27 generates the CRC code CRC_M on the basis of all the information placed preceding the CRC code in the protocol. The CRC code CRC_M is a redundant code attached to the operation to detect an error in the protocol. The CRC code CRC_M is placed immediately preceding a stop flag P at the tail end of the second operation. In other words, the CRC code CRC_M is placed immediately following a message count value MC_M in the second operation.

The write processing unit 28 generates a protocol to be transmitted to the slave 2 (also herein referred to as a write protocol in some cases). The protocol includes at least one first operation and a second operation. The first operation has a data format typically transmitted using the protocol for the CCI and includes a slave address, a register address, and data, as described below. The second operation is the characteristic configuration of the present embodiment and includes a slave address, a W_MC register address, the message count value MC_M counted by the MC_M generation unit 26, and the CRC code CRC_M generated by the CRC_M generation unit 27. The W_MC register address is an address of a register for storing the message count value MC_M, with the register being provided in the image sensor 11 in the slave 2, as described later.

The write processing unit 28 has a slave side MC error detection unit (shown as slave side MC error (M) detection unit) 30 and a slave side CRC error detection unit (shown as slave side CRC error(M) detection unit) 31.

The slave side MC error detection unit 30 has a NACK detection unit upon MC_M transmission 30a and a slave side MC error output unit 30b (shown as SlaveSide MC_err (M)).

The NACK detection unit upon MC_M transmission 30a detects that the slave 2 sends as a reply a NACK signal (receipt notification signal) when the message count value MC_M is embedded in the protocol and transmitted to the slave 2. The NACK signal is a logical inversion signal of the ACK signal and indicates abnormal receipt of information.

If the NACK signal is sent as a reply to the message count value MC_M, the slave side MC error output unit 30b determines that the message count value MC_1M fails to be received normally on the slave side and hence outputs an error detection signal MC_err(M).

The slave side CRC error detection unit 31 has a NACK detection unit upon CRC_M transmission 31a and a slave side CRC error output unit 31b (shown as SlaveSide CRC_err (M)). The NACK detection unit upon CRC_M transmission 31a detects that the slave 2 sends as a reply the NACK signal when the CRC code CRC_M is embedded in the protocol and transmitted to the slave 2. If the NACK signal is sent as a reply to the CRC code CRC_M, the slave side CRC error output unit 31b determines that the CRC code CRC_M fails to be correctly received on the slave side and hence outputs an error detection signal CRC_err (M).

The read processing unit 29 performs read processing of a message count value MC_S and a CRC code CRC_S that are transmitted by the image sensor 11 in the slave 2. The read processing unit 29 has a master side MC error detection unit 32 and a master side CRC error detection unit 33.

The master side MC error detection unit 32 has a first comparator 32a and a master side MC error output unit (shown as MasterSide MC_err) 32b. The first comparator 32a compares the message count value MC_M with the message count value MC_S. The message count value MC_M is counted by the MC_M generation unit 26 in the SoC 5 of the master 1. The message count value MC_S is counted in the image sensor 11 of the slave 2. No match is detected by the first comparator 32a causes the master side MC error output unit 32b to output the master side error detection signal MC_err.

The master side CRC error detection unit 33 has a second comparator 33a and a master side CRC error output unit (shown as MasterSide CRC_err) 33b. The second comparator 33a compares the CRC code CRC_M with the CRC code CRC_S. The CRC code CRC_M is generated by the CRC_M generation unit 27 in the SoC 5. The CRC code CRC_S is generated in the image sensor 11. No match is detected by the second comparator 33a causes the master side CRC error output unit 33b to output the master side error detection signal CRC_err.

The deserializer 6 has a communication unit 34, a CCI unit 35, a FIFO unit 36, an AAL processing unit 37, and an A-PHY processing unit 38. Moreover, in FIG. 3, the deserializer 6 illustrates only the block configuration relating to I2C or I3C communication.

The communication unit 34 communicates with the SoC 5 using I2C or I3C communication. The CCI unit 35 has a write processing unit 35a and a read processing unit 35b. The write processing unit 35a writes the protocol transmitted from the SoC 5 to the FIFO 36 without checking the message count value and the CRC value in the protocol. The protocol transmission processing is performed between the deserializer 6 and the serializer 12 without modification as described above.

The communication unit 34 illustrated in FIG. 3 is included in the first LINK unit 10 illustrated in FIG. 1. In addition, the FIFO unit 36, the AAL processing unit 37, and the A-PHY processing unit 38 illustrated in FIG. 3 are included in the first MUX 7 illustrated in FIG. 1.

Figure 4:
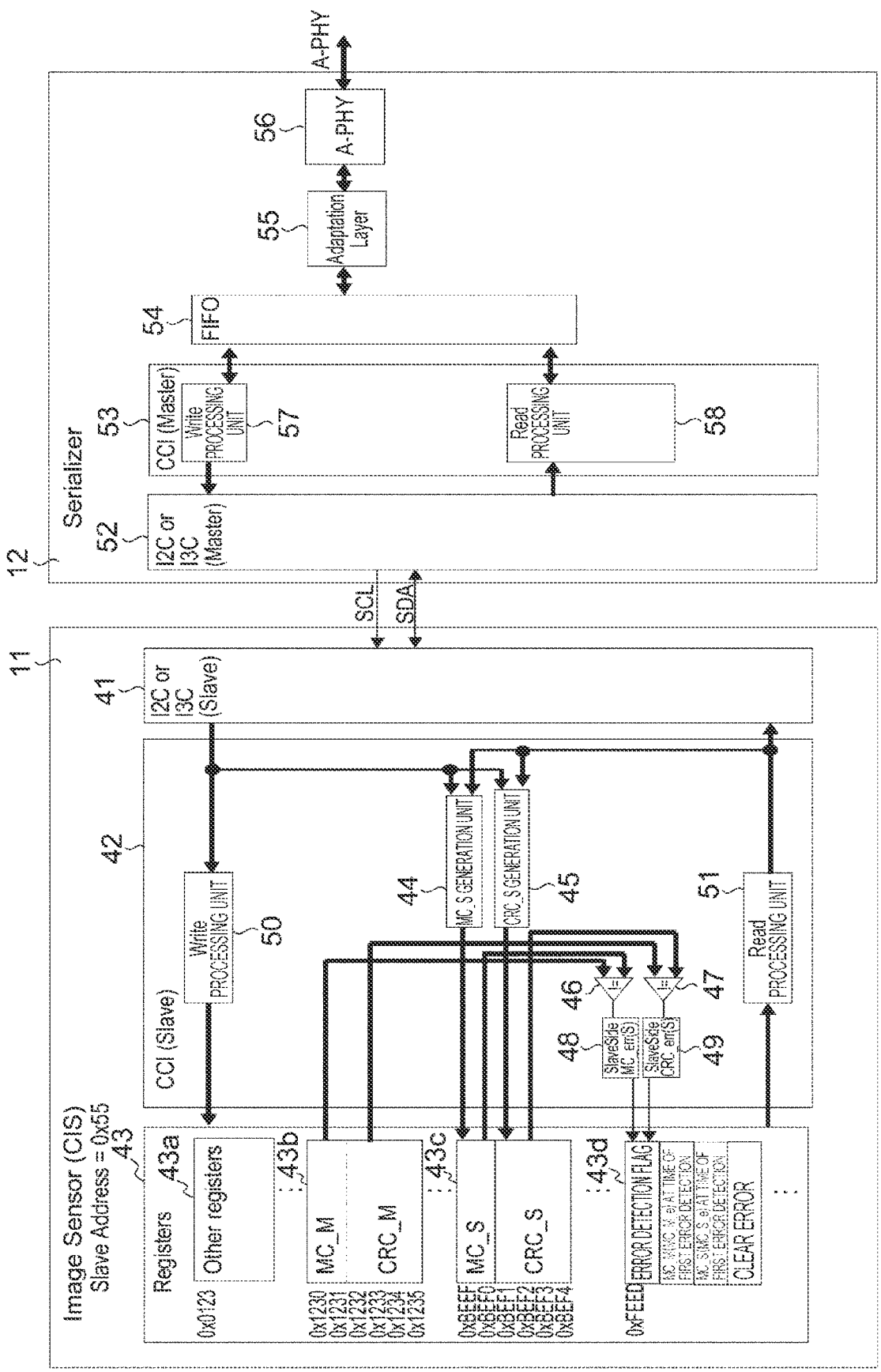
FIG. 4 is a block diagram illustrating an internal configuration of an image sensor and a serializer in a slave.

FIG. 4 is a block diagram illustrating an internal configuration of an image sensor 11 and a serializer 12 in a slave 2. The block diagram in FIG. 4 illustrates a block configuration relating to the protocol for the CCI, while the other components are omitted. The image sensor 11 has a communication unit 41, a CCI unit 42, and a register group 43.

The communication unit 41 communicates with the serializer 12 using I2C or I3C communication. The communication unit 41 receives the protocol transmitted from the serializer 12. The image sensor 11 transmits and receives various information to and from the SoC 5 in the master 1, so the communication unit 41 communicates with the master 1 in accordance with a protocol described later. The protocol includes at least one first operation and a second operation. The second operation includes information indicating the number of protocols (message count value MC_M) and a first CRC code CRC_M. The first CRC code CRC_M is generated by the SoC 5 and incorporated into the protocol.

The CCI unit 42 has an MC_S generation unit (message counter) 44, a CRC_S generation unit (CRC code generation unit) 45, a first comparator 46, a second comparator 47, a slave side MC error detection unit (shown as SlaveSide MC_err(S), or called a first error detection unit) 48, a slave side CRC error detection unit (shown as SlaveSide CRC_err(S), or called a second error detection unit) 49, a write processing unit 50, and a read processing unit 51.

The MC_S generation unit 44 counts the number of the protocols received by the communication unit 41. The CRC_S generation unit 45 generates a second CRC code on the basis of respective pieces of information regarding the first operation and the second operation preceding the first CRC code CRC_M in the protocol received by the communication unit 41.

The first comparator 46 compares the information indicating the number of protocols included in the second operation with the number counted by the MC_S generation unit 44. No match is detected by the first comparator 46 causes the slave side MC error detection unit 48 to output a slave side MC error detection signal MC_err(S). The second comparator 47 compares the first CRC code with the second CRC code. No match is detected by the second comparator 47 causes the slave side CRC error detection unit 49 to output a slave side CRC error detection signal CRC_err(S).

A write processing unit 50 is configured to control a register (first storage unit) 43a of the register group 43 in such a way the register 43a stores the data included in the first operation in a case where the first operation includes identification information of the image sensor 11, the first operation includes identification information of a register (the first storage unit, Other registers) 43a, and the first operation includes R/W bit indicating the write, in which the write processing unit 50 controls a register (second storage unit) 43b of the register group 43 in such a way that the register 43b stores the information indicating the number of the protocols and the first CRC code, which are included in the second operation, in a case where the second operation includes identification information of the register (second storage unit) 43b.

The read processing unit 51 controls transmission of the number counted by the MC_S generation unit 44 and stored in a register 43c (third storage unit) and the second CRC code generated by the CRC_S generation unit 45 via the communication unit 41. This is performed in a case where the first operation includes the identification information of the image sensor 11 and the R/W bit indicating the read, and the second operation includes the identification information of the register (third storage unit) 43c.

The register group 43 is a collection of a plurality of registers. Moreover, the register group 43 can be configured as RAM or non-volatile memory. The register group 43 has a register (first storage unit) 43a, a register (second storage unit) 43b, a register (third storage unit) 43c, and a register (fourth storage unit) 43d.

The register 43a (the first storage unit, or sometimes called other registers) stores data to be included in the first operation in the protocol transmitted from the SoC 5 of the master 1. The first operation has a register address that is the address of the register (first storage unit) 43a. The first operation has data sequentially stored in a particular location of the register (first storage unit) 43a, with the location being specified by the register address.

The register (second storage unit) 43b stores the message count value MC_M in a location specified by an MC_M register address to be included in the second operation in the protocol transmitted from the SoC 5 of the master 1. The register 43b then stores the CRC code CRC_M to be included in the second operation.

The register (third storage unit) 43c stores the message count value MC_S counted by the MC_S generation unit 44 of the image sensor 11 in the slave 2. The register 43c then stores the CRC code CRC_S generated by the CRC_S generation unit 45 of the image sensor 11.

The register (fourth storage unit) 43d stores an error detection flag, a message count value MC_M_e, a message count value MC_S_e, and an error clear register.

The error detection flag has an abnormal packet flag, an error detection flag SS_MC_Err, and an error detection flag SS_CRC_Err. The abnormal packet flag is set to 1 if each operation in the protocol fails to make normal reception. The error detection flag SS_MC_Err is set to 1 when the slave side MC error detection signal MC_err(S) is output. The error detection flag SS_CRC_Err is set to 1 when the slave side CRC error detection signal CRC_err(S) is output.

The message count value MC_M_e is a value obtained by counting messages at the time upon initial detection of an error in the message count value in the slave 2. The message count value MC_S_e is the value obtained by counting messages at the time upon initial detection of an error in the message count value in the slave 2.

The error clear register is set to 1 depending on an instruction from the SoC 5 in the master 1. The setting of the error clear register to 1 causes the error detection flag to be cleared to zero and the message count value MC_M_e and the message count value MC_S_e to be also cleared to zero.

In FIG. 4, the serializer 12 has a communication unit 52, a CCI unit 53, a FIFO unit 54, an AAL processing unit 55, and an A-PHY processing unit 56. The CCI unit 53 has a write processing unit 57 and a read processing unit 58. The serializer 12 has a similar internal configuration to the deserializer 6 in FIG. 3. So, its detailed description is omitted. Checking the message count value and or CRC code is not performed in the serializer 12.

The communication unit 52 illustrated in FIG. 4 is included in the second LINK unit 16 illustrated in FIG. 1. In addition, the FIFO unit 54, the AAL processing unit 55, and the A-PHY processing unit 56 illustrated in FIG. 4 are included in the second MUX 13 illustrated in FIG. 1.

FIG. 5 is a diagram illustrating an example of a CCI-compliant write protocol in the present embodiment. FIG. 5 illustrates the data format for a single write protocol. The write protocol includes one or more operations from a start flag S to a stop flag P. Each operation includes multiple pieces of information in units of eight bits. The start flag S or a restart flag Sr is placed at the head of each operation.

In FIG. 5, the write protocol is transmitted from the SoC 5 in the master 1 to the image sensor 11 in the slave 2. Moreover, the write protocol transmitted from the master 1 is, specifically, received by the deserializer 6 illustrated in FIG. 3. The deserializer 6 transmits the received write protocol to the serializer 12, as illustrated in FIG. 1. The serializer 12 transmits the received write protocol to the image sensor 11, as illustrated in FIG. 4. The deserializer 6 and the serializer 12 only relay the write protocol, so the write protocol transmitted from the SoC 5 is received by the image sensor 11 in its original data format with no modification.

In FIG. 5, the write protocol illustrates an example including three operations. More specifically, the write protocol includes two first operations and one second operation in FIG. 5. The first operation is a normal write operation in the CCI. Each of the first operations includes the start flag S or the restart flag Sr, slave address [7:1], an R/W bit, register address [15:8], register address [7:0], and one or more data [7:0], in this order from the head of the operation.

The first operation includes a plurality of 8-bit length information items as illustrated in FIG. 5, and an ACK signal is received from a communication partner device (slave 2) each time when transmitting the respective pieces of information to the communication partner device.

In the case where the write protocol includes a plurality of first operations, the start flag S is attached to the leading first operation at the beginning position of the operation, and the restart flag Sr is attached to the beginning position of the subsequent first operation.

The R/W bit is a 1-bit write bit value or read bit value. In one example, 0 is the write bit value, and 1 is the read bit value. In the write protocol, the R/W bit is set to the write bit value (e.g., 0 (zero)).

In the write protocol illustrated in FIG. 5, the second operation is placed following one or more first operations. The second operation has the same data format as the first operation. More specifically, the second operation includes the restart flag Sr, slave address [7:1], W_MC register address [15:8], W_MC register address [7:0], message count value W_MC [15:8], message count value W_MC [7:0], CRC code W_CRC [31:24], CRC code W_CRC [23:16], CRC code W_CRC [15:8], CRC code W_CRC [7:0], and stop flag P, in this order from the head of the operation.

The stop flag P at the tail end of the second operation means the end of the write protocol. Upon detecting the stop flag P, the MC_M generation unit 26 of the SoC 5 illustrated in FIG. 3 and the MC_S generation unit 44 of the image sensor 11 illustrated in FIG. 4 count up the respective message count values by one.

In FIG. 5, the protocol is capable of including multiple first operations, which are placed continuously and sequentially written. No other processing (e.g., sequential read operation) can be performed between sequential write operations. This is to have the arrangement to transmit the second operation following the sequential write.

In FIG. 5, the protocol includes one or more first operations and the second operation, which need to have the same slave address. In one example, in transmitting a protocol from the SoC 5 to the image sensor 11, each operation in the protocol illustrated in FIG. 5 needs to use the address of the image sensor 11 as a slave address.

In the write protocol illustrated in FIG. 5, the second operation has a data format matching the data format of the first operation. In the second operation, the head position (leading bit position) of the message count value is identical to the head position of the data in the first operation. In addition, in the second operation, the CRC code is placed immediately following the message count value. In other words, the CRC code is attached at the tail end of the protocol (immediately preceding the stop flag).

The CRC code is a variable-length code in which its value varies depending on the amount of information in the protocol. The CRC_M generation unit 27 of the SoC 5 in FIG. 3 and the CRC_S generation unit 45 of the image sensor 11 in FIG. 4 each generate the CRC code on the basis of all the information placed preceding their respective CRC codes in the protocol. Thus, the larger the amount of information included in the protocol, the longer the bit length of the CRC code.

Figure 6A:
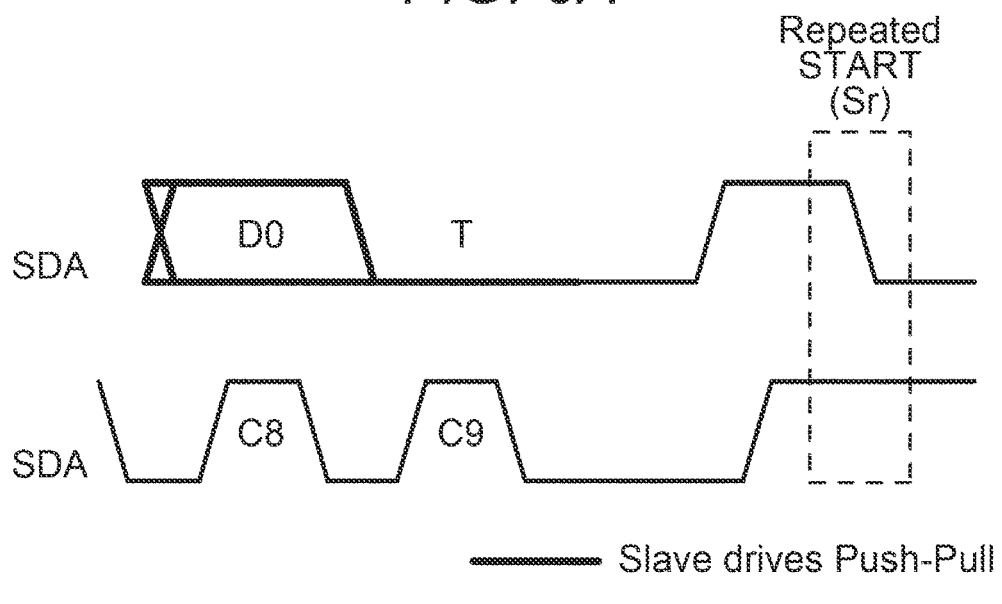
FIG. 6A is a waveform diagram illustrating a start flag and a restart flag.
Figure 6B:
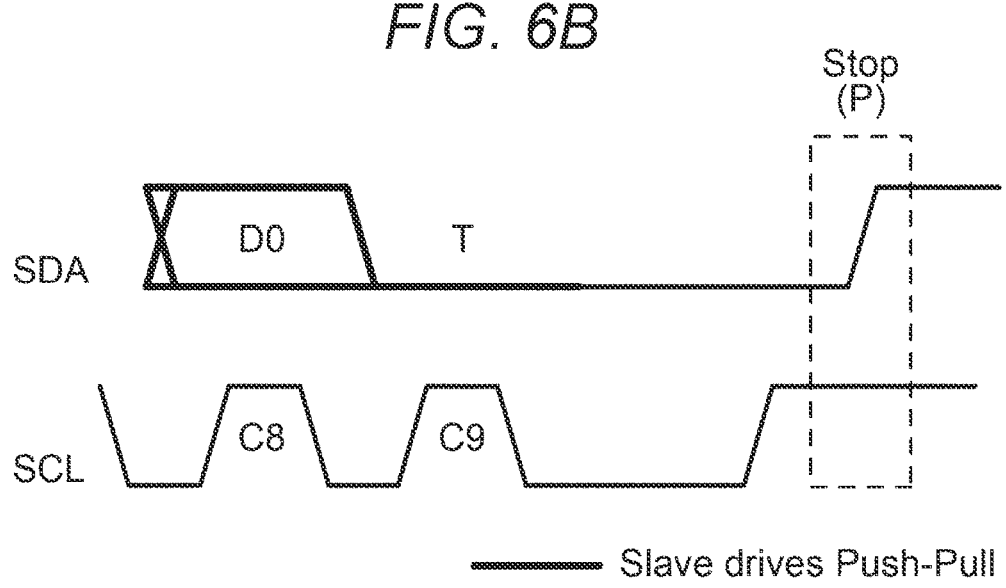
FIG. 6B is a waveform diagram illustrating a stop flag.

The write protocol illustrated in FIG. 5 is transmitted serially using I2C or I3C communication. In I2C or I3C communication, various types of information can be transmitted by correlated signal waveforms of serial data SDA and a clock SCL. FIG. 6A is a waveform diagram illustrating a start flag and a restart flag, and FIG. 6B is a waveform diagram illustrating a stop flag. As illustrated in FIG. 6A, the transition of the serial data SDA from high to low when the clock SCL is high is set as the start flag or restart flag. In addition, as illustrated in FIG. 6B, the transition of the serial data SDA from low to high when the clock SCL is high is set as the stop flag.

As described above, the write protocol in FIG. 5 is configured by continuously placing at least one first operation and the second operation. The first operation includes identification information of the slave 2 that is the communication partner device, write-instructing information, identification information of the register (first storage unit) 43a of the slave 2, and data to be written in the register 43a (first storage unit). The second operation includes an address of the slave 2, an R/W bit representing the write-instructing information, identification information of the register (second storage unit) 43b of the slave 2, information, which indicates the number of protocols, and a CRC code, which is used to detect an error in the protocol. The register (second storage unit) 43b stores the CRC code and the number-of-protocols information.

Figure 7:
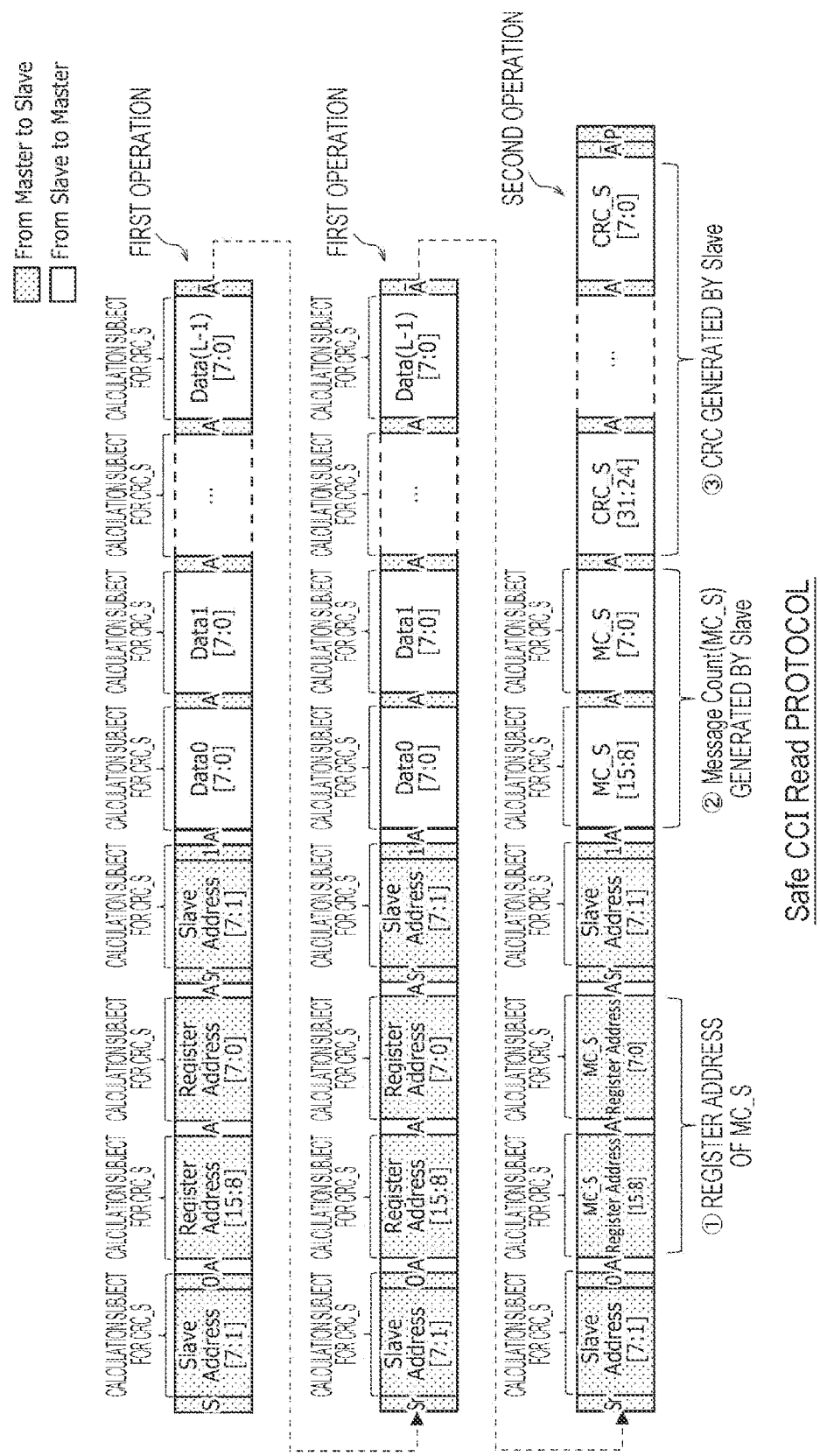
FIG. 7 is a diagram illustrating an example of a CCI-compliant read protocol in the present embodiment.

FIG. 7 is a diagram illustrating an example of a CCI-compliant read protocol in the present embodiment. FIG. 7 illustrates the data format for a single read protocol. The read protocol, similar to the write protocol, includes one or more operations from the start flag S to the stop flag P. In FIG. 7, the read protocol allows the master 1 to request the slave 2 to read data and allows the master 1 to read the data transmitted by the slave 2 in response to the request. In the present embodiment, the description is given of an example in which the master 1 is the SoC 5 and the slave 2 is the image sensor 11.

In FIG. 7, the read protocol illustrates an example involving three operations. More specifically, in FIG. 7, the read protocol includes two first operations and one second operation. The first operation is a normal read operation in the CCI. The first operation includes a start flag S or a restart flag Sr, slave address [7:1], an R/W bit indicating the write, register address [15:8], register address [7:0], a restart flag, slave address [7:1], and an R/W bit indicating the read, in this order from the head of the operation.

As described above, in FIG. 7, the first operation of the read protocol includes two R/W bits. Of them, one leading R/W bit is a write bit value. This bit is used to hold the register address to be read in the image sensor 11, which is called dummy write. The other R/W bit is a read bit value, meaning that the data at the register address in the first operation or the second operation is to be read.

In FIG. 7, the slave address of the read protocol is sent twice, but both slave addresses need to be identical. In one example, in transmitting read-requesting information from the SoC 5 to the slave 2, two slave addresses included in this read-requesting information are both the addresses of the image sensor 11 in the slave 2.

In the case where the slave 2 transmits information in response to the read-requesting information in the first operation described above and the master 1 receives the information, the received information is sequentially attached following the second-located slave address in the first operation. The read-requesting information in the first operation includes a read request for a particular register address in the slave 2, so the data read out from the particular register address is sequentially attached following the second-located slave address in the first operation. In this case, the data is attached in 8-bit units. The master 1 sends as a reply an ACK signal to the slave 2 each time when receiving 8-bit data.

In FIG. 7, the second operation in the protocol includes a restart flag, R_MC register address [15:8], an R/W bit, R_MC register address [7:0], a restart flag, slave address [7:1], and an R/W bit. Each piece of information is the read-requesting information and is transmitted to the slave 2. The first-located R/W bit in the second operation is a write bit value, indicating dummy write. In addition, the second-located R/W bit is a read bit value, and the data corresponding to the register address is read and transmitted to the SoC 5.

In the protocol upon the read, the first operation and the second operation have the same data format, similar to the protocol upon the write. The second operation also sends the slave address twice, but both slave addresses need to be the same.

In the case where the slave 2 transmits information in response to the read-requesting information in the second operation described above and the master 1 receives the information, the received information is sequentially attached following the second-located slave address in the second operation. The read-requesting information in the second operation requests the read of the message count value R_MC and the CRC code R_CRC in the slave 2, so these pieces of information are attached in order following the second-located slave address. The second operation also attaches the data in 8-bit units. The master 1 sends as a reply an ACK signal to the slave 2 every time when receiving the 8-bit data.

The second operation attaches the CRC code R_CRC following the message count value R_MC. The CRC code r_CRC is followed by a stop flag indicating the end of the protocol.

Each operation in the protocol upon the read needs to have identical slave addresses. The message count value included in the protocol is counted separately for each slave 2. Different slave addresses of the operations in the protocol will cause a failure to specify whether the message count value of the slave 2 is included in the protocol.

In FIG. 7, the read protocol can include a plurality of first operations. In this case, sequential read is performed in which a plurality of first operations is continuously read. No other processing (e.g., sequential write or the like) can be performed while the sequential read is being performed. Performing the sequential write during the sequential read will necessitate calculating and transmitting the CRC code W_CRC.

At the end of each operation in the protocol, not the ACK signal, the NACK signal, which is the logical inversion of the ACK signal, is transmitted from the master 1 to the slave 2. Sending as a reply the NACK signal to the slave 2 makes it possible for the master 1 to notify the slave 2 of the completion of reception of each operation.

As described above, the read protocol illustrated in FIG. 7 has the configuration in which at least one first operation and the second operation are continuously placed. The first operation includes first read-requesting information and the information that is read from the register (first storage unit) 43a in response to the first read-requesting information and transmitted from the slave 2. The first read-requesting information includes the identification information of the slave 2 that is a communication partner device, the write-instructing information, identification information of the register (first storage unit) 43a of the slave 2, the identification information of the slave 2, and read-instructing information. The second operation includes the second read-requesting information and the information that is read from the register 43c (third storage unit) in response to the second read-requesting information and transmitted from the slave 2. The second read-requesting information includes the identification information of the slave 2, the write-instructing information, the identification information of the register (third storage unit) 43c, the identification information of the slave 2, and the read-instructing information. The register (third storage unit) 43c stores the information, which indicates the number of protocols counted by the slave 2, and the CRC code, which is generated by the slave 2 and used to detect an error in the protocol.

Figure 8:
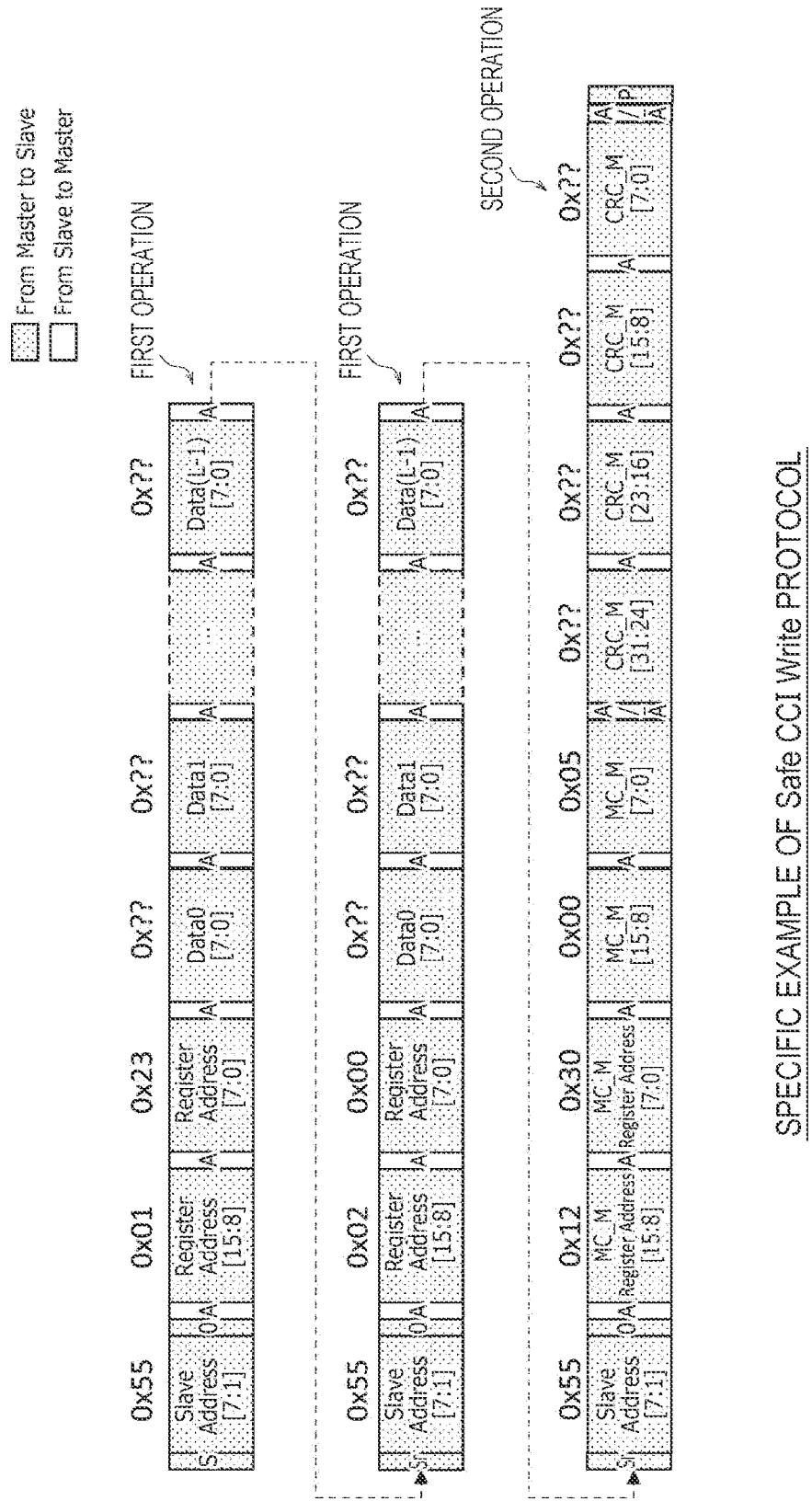
FIG. 8 is a diagram illustrating a specific example of a write protocol.

FIG. 8 is a diagram illustrating a specific example of a write protocol. FIG. 8 illustrates appending the address of each register in the image sensor 11 to each piece of information in the write protocol transmitted from the SoC 5 of the master 1 to the image sensor 11 of the slave 2. The slave address of the image sensor 11 in the slave 2 is 0x55 as illustrated in FIG. 4, so the slave address in the protocol illustrated in FIG. 8 is 0x55. In addition, the register group 43 of the image sensor 11 illustrated in FIG. 4 is provided with the register 43a (first storage unit, also called other resisters) having an address of 0x0123. Setting the register address of the first operation in the protocol illustrated in FIG. 8 to 0x01 and 0x23 in 8-bit units specifies the address 0x123 of the register 43a (first storage unit, also called other registers). This configuration allows the data placed following the register address of the first operation to be stored in the register (first storage unit) 43a in 8-bit units.

The register group 43 is provided with the register (second storage unit) 43b starting from the address 0x1230 as illustrated in FIG. 4. The register (second storage unit) 43b stores the message count value W_MC and the CRC code W_CRC, which are transmitted from the master 1.

Setting the W_MC register addresses of the second operation in the protocol illustrated in FIG. 8 to 0x12 and 0x30 allows a total of 16-bit data, which is to be placed subsequently, to be stored in the register (second storage unit) 43b as the message count value MC_M, which then also allows the CRC code CRC_M, which is to be placed subsequently, to be continuously stored in the register (second storage unit) 43b. The CRC code has a variable length, so the image sensor 11 of the slave 2 recognizes the data from immediately following the message count value in the protocol to the stop flag P as the CRC code. FIG. 8 represents the CRC code CRC_M as "0x??".

FIG. 9 is a diagram illustrating a specific example of a read protocol. In FIG. 9, the read protocol includes data transmitted by the image sensor 11 of the slave 2 in response to the read-requesting information transmitted from the SoC 5 of the master 1.

The read-requesting information of the first operation in the protocol includes slave address 0x55, an R/W bit indicating the write, register address 0x0123, second-located slave address 0x55, and an R/W bit indicating the read. The slave addresses are all the same, and the slave address of the image sensor 11 is 0x55. The register address 0x0123 is the address of the register (first storage unit) 43a in the register group 43. The first-located R/W bit set as the write bit value is intended to hold the register address to be read, which corresponds to the dummy write described above. Setting the second-located R/W bit as the read bit value allows the data read from the image sensor 11 to be transmitted to the SoC 5.

The image sensor 11 reads the data from the specified register address in the register group 43 in response to the received read-requesting information and transmits the read data. FIG. 8 represents the read data as "0x??".

The read-requesting information of the second operation in the protocol includes slave address 0x55, an R/W bit indicating the write, an R_MC register address 0XBEEF, second-located slave address 0x55, and an R/W bit indicating the read. In the second operation, the slave addresses are all the same, and the slave address of the image sensor 11 is 0x55. The R_MC register address is the head address of the register (third storage unit) 43c in the register group 43. The image sensor 11 stores the message count value MC_S of the MC_S generation unit 44 and the CRC code CRC_S generated by the CRC_S generation unit 45 in the register (third storage unit) 43c. Thus, the image sensor 11 transmits the message count value MC_S and the CRC code CRC_S read from the register (third storage unit) 43c in response to the read-requesting information by including them in the second operation. The image sensor 11, when completing the transmission of the variable-length CRC code CRC-S, attaches the stop flag P.

Figure 10A:
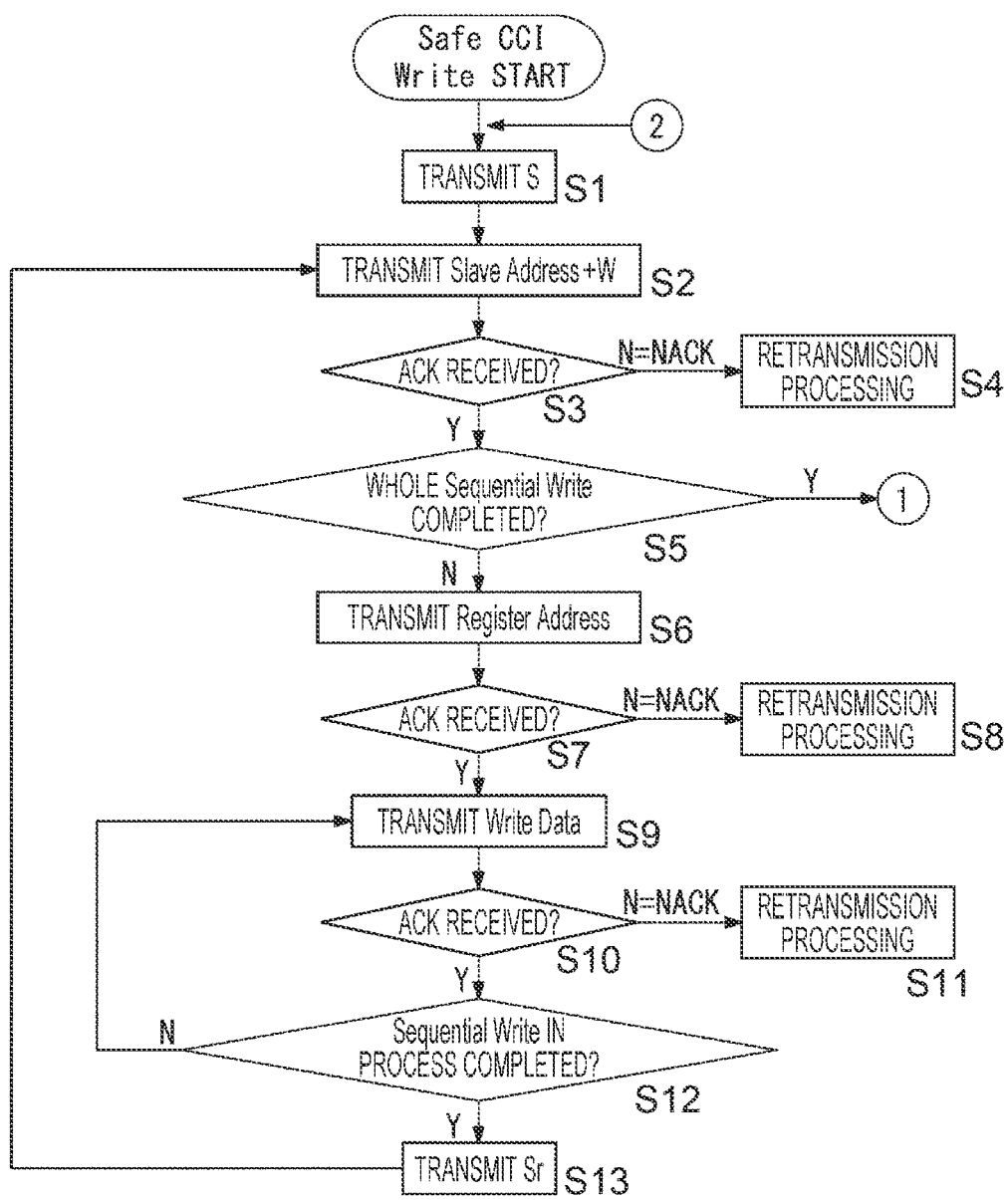
FIG. 10A is a flowchart illustrating a procedure of write processing in the SoC.
Figure 10B:
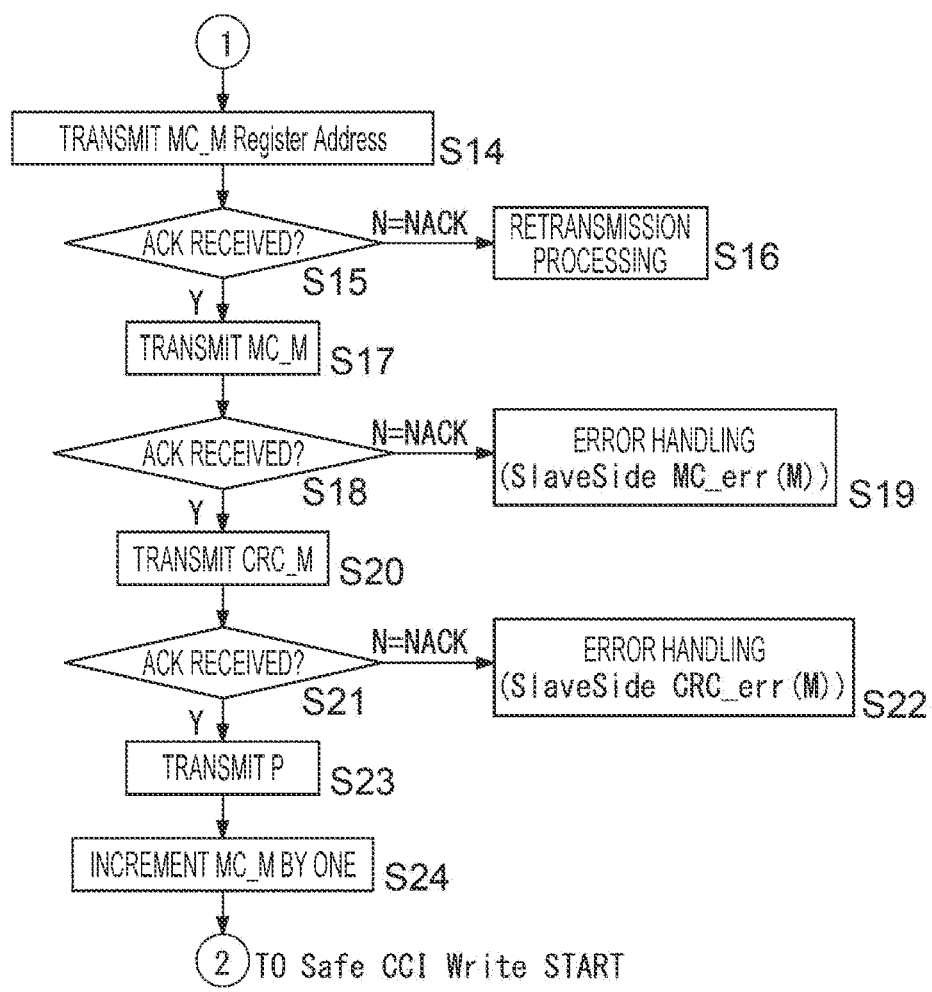
FIG. 10B is a flowchart illustrating a continuation of the flowchart of FIG. 10A.

FIGS. 10A and 10B are flowcharts illustrating a procedure for write (Safe CCI Write, illustrated in the drawings) processing in the SoC 5. This flowchart illustrates the processing procedure in which the SoC 5 of the master 1 transmits the write protocol illustrated in FIG. 5 to the image sensor 11 of the slave 2.

The start flag S is first transmitted (step S1). The slave address and the R/W bit indicating the write are then transmitted (step S2). In this case, the bit value of the R/W bit is, for example, 0 (zero). The slave address is the identification information of the image sensor 11.

The determination of whether or not the ACK signal is received from the slave 2 is then performed (step S3). The master 1 transmits information in 8-bit units to the slave 2 as illustrated in FIG. 5, and the slave 2 sends as a reply the ACK signal each time when receiving the information. The reception of the ACK signal by the master 1 makes it possible to recognize the reception of the information by the slave 2. The slave 2, which fails to receive the information normally, sends as a reply the NACK signal that is a logical inversion of the ACK signal.

The master 1, if the NACK signal is received in step S3, performs retransmission processing illustrated in FIG. 11A described later (step S4). If the ACK signal is received in step S3, the determination of whether or not the whole sequential write is completed is performed (step S5). The sequential write refers to continuously transmitting all of one or more first operations in the protocol and writing them in the image sensor 11 as described above. If the sequential write is not completed yet, the register address in the first operation that has not been transmitted is transmitted (step S6). The register address is an address of a particular register (e.g., the first storage unit) in the register group 43 of the image sensor 11 illustrated in FIG. 4.

The determination of whether or not the ACK signal to the transmitted register address is received is then performed (step S7). If the NACK signal is received rather than the ACK signal, the retransmission processing illustrated in FIG. 11A described later is performed (step S8).

If the ACK signal is determined to be received in step S7, the data corresponding to the transmitted register address is transmitted (step S9). The data is also transmitted in 8-bit units as illustrated in FIG. 5. The determination of whether or not the ACK signal to the transmitted data is received is then performed (step S10). If the NACK signal is received rather than the ACK signal, the retransmission processing illustrated in FIG. 11A described later is performed (step S11).

If the ACK signal is received in step S10, the determination of whether or not the transmission of a single first operation is completed is performed (step S12). If the transmission is not completed yet, the processing in steps S9 to S12 is repeated.

If the transmission is completed, the restart flag Sr is transmitted (step 313), and then the processing in step S2 and subsequent steps is performed. The restart flag Sr is transmitted by the adjustment of the timing of SDA and SCL as illustrated in FIG. 6A.

The processing in steps S1 to S13 described above allows all the first operations included in the write protocol to be transmitted.

If the sequential write of the first operation is determined to be completed in step S5, the W_MC register address is then transmitted (step S14). The W_MC register is the register (second storage unit) 43*b*, which stores the message count value, in the register group 43 of the image sensor 11. The address of the register (second storage unit) 43*b* is transmitted in step S14.

The determination of whether or not the ACK signal to the W_MC register address is received is then performed (step S15). If the NACK signal is received rather than the ACK signal, the retransmission processing illustrated in FIG. 11A described later is performed (step S16).

If the ACK signal is received in step S15, the message count value W_MC counted by the MC_M generation unit 26 of the SoC 5 is transmitted (step S17). The determination of whether or not the ACK signal to the transmitted message count value W_MC is received is then performed (step S18). If the NACK signal is received rather than the ACK signal, error handling illustrated in FIG. 11B described later is performed (step S19). The processing in step S19 corresponds to the processing by a first error handling unit.

If the ACK signal is received in step S18, the CRC code W_CRC generated by the CRC_M generation unit 27 in the SoC 5 is transmitted (step S20). The determination of whether or not the ACK signal to the transmitted CRC code W_CRC is received is then performed (step S21). If the NACK signal is received rather than the ACK signal, error handling illustrated in FIG. 11B described later is performed (step S22). The processing in step S22 corresponds to the processing by a second error handling unit.

If the ACK signal is received in step S21, the stop flag P is transmitted (step S23). The stop flag P is transmitted by the adjustment of the timing of the serial data SDA and the clock SCL as illustrated in FIG. 6B. Accordingly, the completion of the transmission of one write protocol causes the message count value of the MC_M generation unit 26 in the SoC 5 to increment by one (step S24).

Figure 11A:
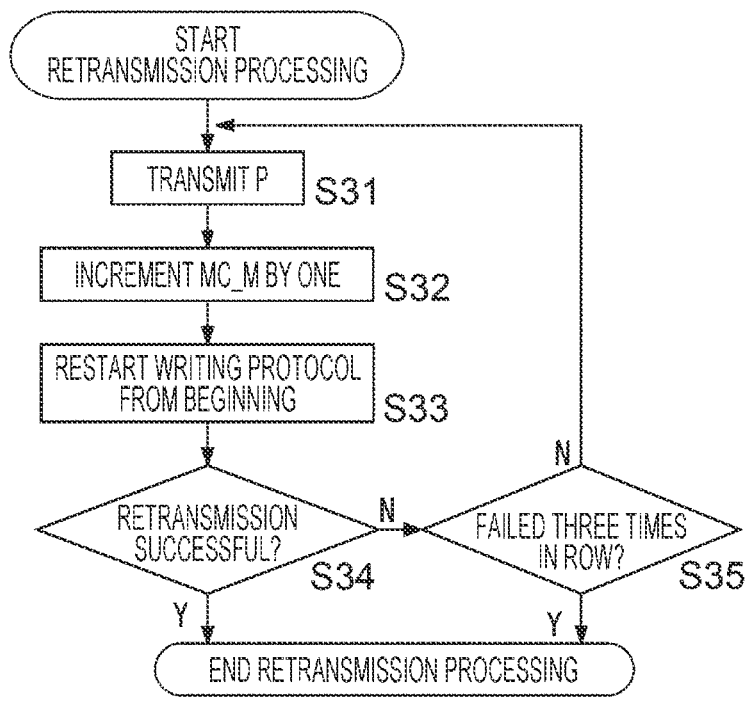
FIG. 11A is a flowchart illustrating a detailed processing procedure of retransmission processing performed in steps S4, S8, and S11 in FIG. 10A and step S16 in FIG. 10B.

FIG. 11A is a flowchart illustrating a detailed processing procedure of retransmission processing performed in steps S4, S8, and S11 in FIG. 10A and step S16 in FIG. 10B. The stop flag P is first transmitted (step S31). Moreover, the processing in step S31 can be omitted. In other words, the processing in step S32 and subsequent steps can be performed without transmitting the stop flag P to the slave 2. The message count value of the MC_M generation unit 26 of the SoC 5 then increments by one (step S32). Next, the processing in step S1 and subsequent steps in FIG. 10A restarts (step S33).

The determination of whether or not the retransmission is successful is then performed (step S34). If the retransmission is unsuccessful, the determination of whether or not the retransmission has failed three times in a row is performed (step S35). If the retransmission failure does not yet reach three times, the processing in step S31 and subsequent steps is repeated. If the retransmission is determined to be successful in step S34, or if the retransmission is determined to be unsuccessful three times in a row in step S35, the retransmission processing ends. In the case of three consecutive failures, the processing to be performed after completion of the retransmission processing can be optionally determined. In one example, the processing of reading the error flag of the image sensor 11 in the slave 2, restarting the retransmission processing after a lapse of a predetermined time, displaying a warning, or the like can be performed.

Figure 11B:
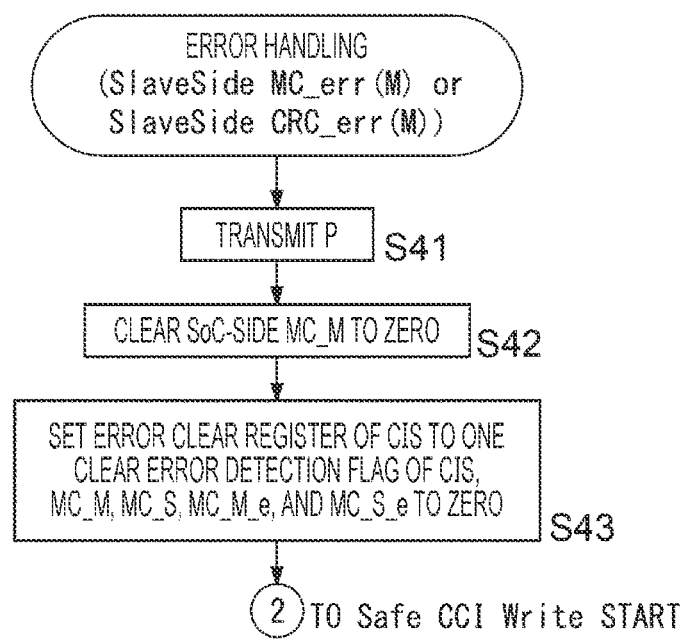
FIG. 11B is a flowchart illustrating a detailed processing procedure of error handling performed in steps S19 and S22 in FIG. 10B.

FIG. 11B is a flowchart illustrating a detailed processing procedure of error handling performed in steps S19 and S22 in FIG. 10B. The stop flag P is first transmitted (step S41). The message count value W_MC in the SoC 5 is then cleared to zero (step S42). Next, in the error clear register of the register (fourth storage unit) 43*d* in the register group 43 of the image sensor 11, a bit value of 1 is written. This configuration allows the error detection flag in the register (fourth storage unit) 43*d* to be cleared to zero, and the message count values MC_M_e and MC_S_e upon the first error detection to be cleared to zero (step S43). The processing of step S1 and subsequent steps in FIG. 10A then restarts (step S54).

Figure 12B:
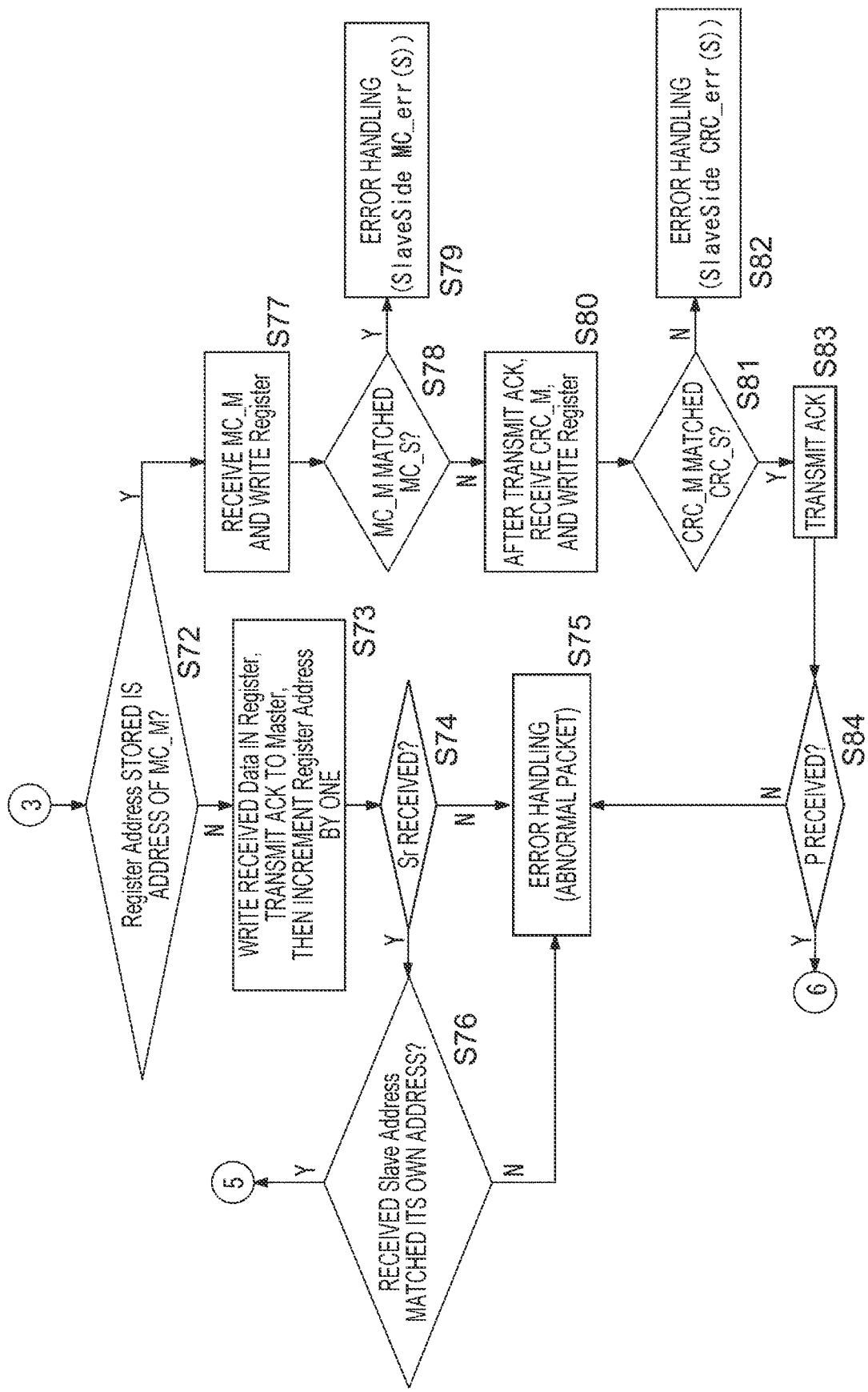
FIG. 12B is a flowchart illustrating a continuation of the flowchart of FIG. 12A.
Figure 12C:
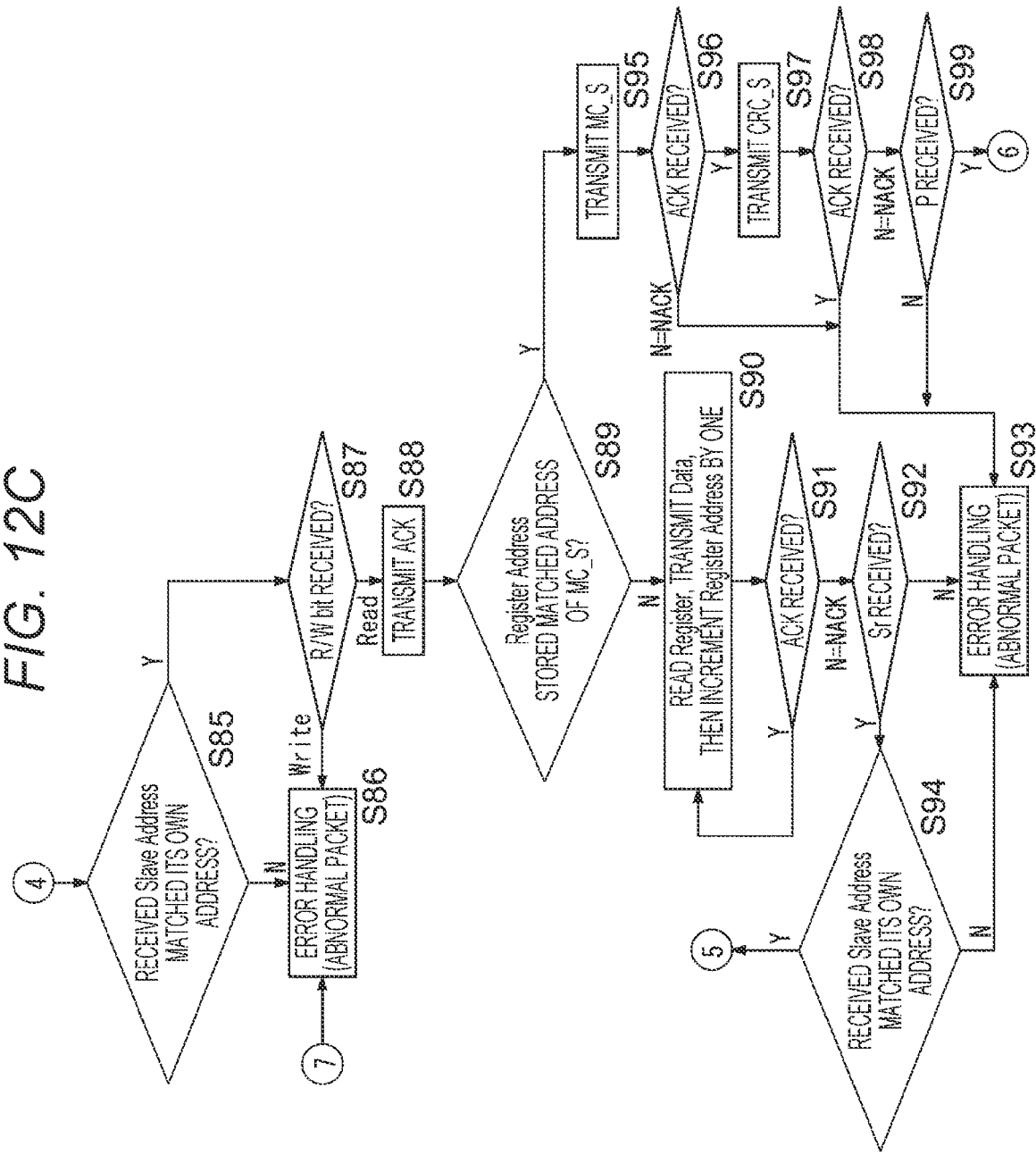
FIG. 12C is a flowchart illustrating a continuation of the flowchart of FIG. 12B.

FIGS. 12A, 12B, and 12C are flowcharts illustrating a processing procedure in the image sensor 11. This flowchart illustrates a processing procedure in a case where the image sensor 11 receives the write protocol illustrated in FIG. 5 or the read protocol of FIG. 7 from the SoC 5.

The processing first waits until the start flag S is received (step S61). If the start flag S is received, the determination of whether or not the received slave address matches its own address is performed (step S62). If the stop flag P does not match its own address, the processing waits until the stop flag P is received (step S63), and if the stop flag P is received, the processing in step S61 and subsequent steps is repeated.

If the slave address is determined to match its own address in step S62, the processing waits until the R/W bit is received (step S64). If the R/W bit is a write bit value (for example, 0), the image sensor 11 determines whether or not it is ready to receive a protocol (step S65).

If the preparation is determined not ready in step S65, the NACK signal is sent as a reply to the SoC 5 (step S66). The determination of whether or not the stop flag P is received is then performed (step S67). If the stop flag P is received, the message count value MC_S counted by the MC_S generation unit 44 increments by one (step S68), and the processing in step S62 and subsequent steps is performed.

If it is determined in step S65 that the image sensor 11 is ready for reception, an ACK signal is sent as a reply (step S69). Next, after the register address during the first operation included in the protocol is received and stored, an ACK signal is sent as a reply (step S70).

The determination of whether or not the restart flag Sr is received is then performed (step S71). If it is determined that the restart flag Sr is not received, the determination of whether or not the register address received and stored is the address of the register (second storage unit) 43*b* that stores the message count value MC_M is performed (step S72). If it is not the address of the register (second storage unit) 43*b*, the received data is stored in the register (first storage unit, other resisters) 43*a*, an ACK signal is sent as a reply to the master 1, and the register address increments by one (step S73).

The determination of whether or not the restart flag Sr is received is then performed (step S74). If the restart flag Sr is not received, it is determined that the packet is an abnormal packet, and error handling illustrated in FIG. 13A described later is performed (step S75). On the other hand, if it is determined that the restart flag S is received in step S74, the determination of whether or not the received slave address matches its own address is performed (step S76). If they match, the processing in step S64 and subsequent steps is repeated, and if they do not match, the error handling in step S75 is performed.

If the address of the message count value MC_M is determined in step S72, the message count value MC_1M included in the second operation in the received protocol is received and stored in the register (second storage unit) 43b (step S77).

Next, the determination of whether or not the received message count value MC_M matches the message count value MC_S counted by the MC_S generation unit 44 in the slave 2 is performed (step S78). If they do not match, error handling in FIG. 13B described later is performed (step S79).

If the two are determined to be matched in step S78, after the ACK signal is sent as a reply to the master 1, the CRC code CRC_M included in the second operation of the protocol is received and stored in the register (second storage unit) 43b (step S80).

Next, the determination of whether or not the received CRC code CRC_M matches the CRC code CRC_S generated by the CRC_S generation unit 45 in the slave 2 is performed (step S81). If they do not match, error handling in FIG. 13C described later is performed (step S82).

If the two are determined to be matched in step S81, the ACK signal is sent as a reply to the master 1 (step S83), and then the determination of whether or not the stop flag P has been received is performed (step S84). If the stop flag P has not been received, the error handling in step S75 is performed, and if the stop flag P has been received, the processing in step S68 and subsequent steps is repeated.

If the restart flag is determined to be received in step S71, the determination of whether or not the received slave address matches its own address is performed (step S85). If they do not match, error handling in FIG. 13A described later is performed (step S86).

If the two are determined to be matched in step S85, the determination of the R/W bit is performed (step S87). If it is the write bit value (for example, 0), the error handling in step S86 is performed. In addition, if the read bit value (for example, 1) is determined in step S64, the error handling in step S86 is performed.

On the other hand, if the read bit value (for example, 1) is determined in step S87, the ACK signal is sent as a reply to master 1 (step S88).

Next, the determination of whether or not the register address received and stored is the address of the message count value MC_S stored in the register (second storage unit) 43b in the register group 43 is performed (step S89). If it is not the address of the message count value MC_S, data corresponding to the register address received and stored is read, and the register address increments by one after the data is transmitted to the master 1 (step S90).

The determination of whether or not the ACK signal or the NACK signal from the master 1 is received is then performed (step S91). If the ACK signal is received, the processing in steps S90 to S91 is repeated, and if the NACK signal is received, the determination of whether or not the restart flag Sr is received is performed (step S92). If the restart flag Sr is not received, error handling illustrated in FIG. 13A described later is performed (step S93). If the restart flag Sr is received, the determination of whether or not the next received slave address matches its own address is performed (step S94). If the address matches its own address, the processing in step S64 and subsequent steps is repeated. If it does not match its own address, error handling in step S93 is performed.

On the other hand, if the address of the message count value MC_S stored in the register (second storage unit) 43b is determined in step S89, the message count value MC_S in the register (second storage unit) 43b is transmitted to the master 1 (step S95).

The determination of whether or not the ACK from the master 1 is received is then performed (step S96). If the ACK signal is received, the CRC code CRC_S in the register (third storage unit) 43c is transmitted to the master 1 (step S97). The determination of whether or not the ACK signal or the NACK signal from the master 1 is received is then performed (step S98). If the ACK signal is received, error processing in step S93 is performed. If the NACK signal is received, the determination of whether or not the stop flag P is received is then performed (step S99). If the stop flag P has not been received, the error handling illustrated in FIG. 13A described later is performed, and if the stop flag P has been received, the processing in step S68 and subsequent steps is repeated.

Figure 13A:
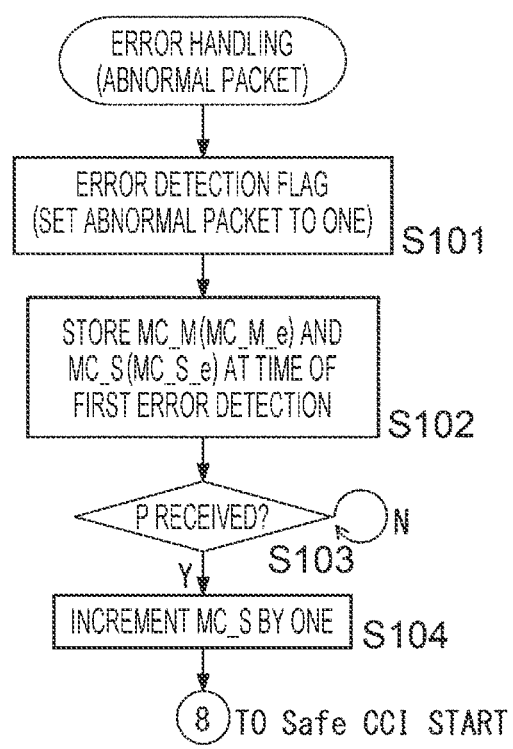
FIG. 13A is a flowchart illustrating a detailed processing procedure of error handling in step S75 in FIG. 12B and steps S86 and S93 in FIG. 12C.

FIG. 13A is a flowchart illustrating a detailed processing procedure of error handling in step S75 in FIG. 12B and steps S86 and S93 in FIG. 12C. First, the error detection flag (abnormal packet flag) of the register (fourth storage unit) 43d is set to 1 (step S101). Next, the message count values MC_M_e and MC_S_e at the time of the first error detection are stored in the register (fourth storage unit) 43d (step S102). The message count value MC_M_e is a value received from the master 1, and the message count value MC_S_e is a value counted by the MC_S generation unit 44 in the slave 2.

Next, the processing waits until the stop flag P is received (step S103). If the stop flag P is received, the message count value MC_S increments by one (step S104). Thereafter, the processing in step S61 and subsequent steps in FIG. 12A is performed again (step S105).

Figure 13B:
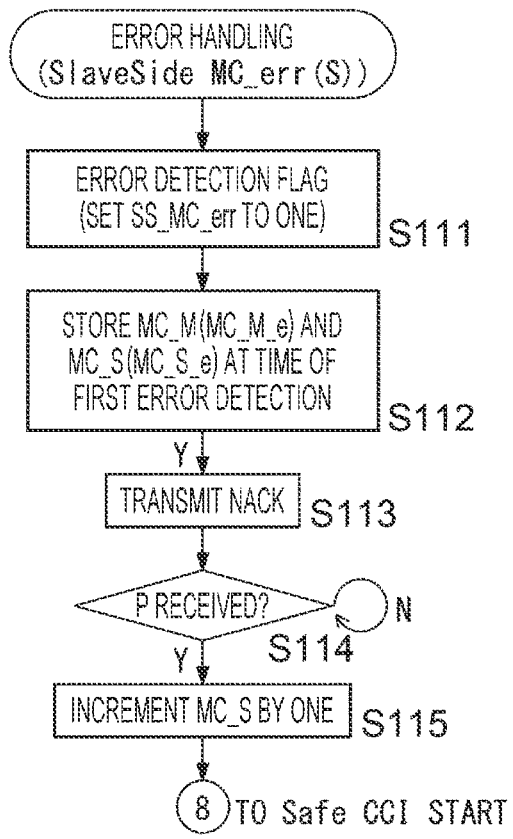
FIG. 13B is a flowchart illustrating a detailed processing procedure in step S79 in FIG. 12B.

FIG. 13B is a flowchart illustrating a detailed processing procedure in step S79 in FIG. 12B. First, the error detection flag SS_MC_Err of the register (fourth storage unit) 43d is set to 1 (step S111). Next, the message count values MC_M_e and MC_S_e at the time of the first error detection are stored in the register (fourth storage unit) 43d (step S112). Next, the NACK signal is sent as a reply to master 1 (step S113). By sending the NACK signal to the master 1, the master 1 can grasp that the message count values MC_M and MC_S do not match.

Next, the processing waits until the stop flag P is received (step S114). If the stop flag P is received, the message count value MC_S increments by one (step S115). Thereafter, the processing in step S61 and subsequent steps in FIG. 12A is performed again (step S116).

Figure 13C:
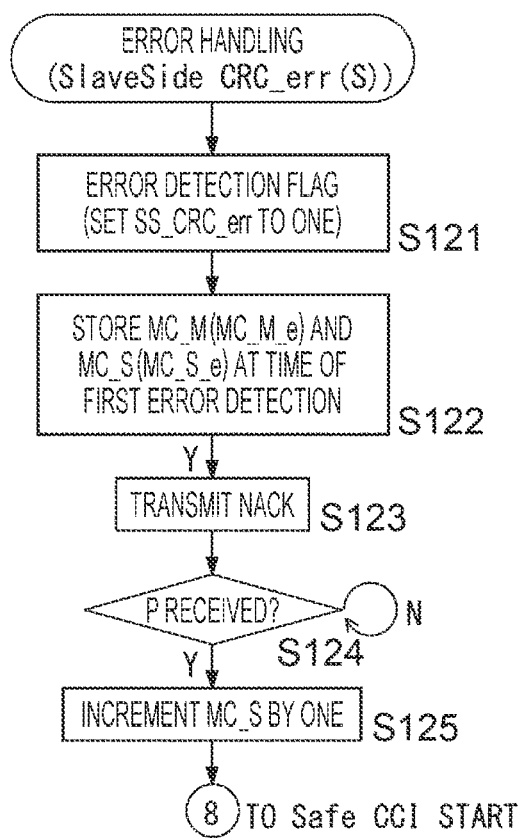
FIG. 13C is a flowchart illustrating a detailed processing procedure in step S82 in FIG. 12B.

FIG. 13C is a flowchart illustrating a detailed processing procedure in step S82 in FIG. 12B. First, the error detection flag SS_CRC_Err of the register (fourth storage unit) 43d is set to one (1) (step S121). Next, the message count values MC_M_e and MC_S_e at the time of the first error detection are stored in the register (fourth storage unit) 43d (step S122). Next, the NACK signal is sent as a reply to master 1 (step S123). By sending the NACK signal to the master 1, the master 1 can grasp that the message count values MC_M and MC_S do not match.

Next, the processing waits until the stop flag P is received (step S124). If the stop flag P is received, the message count value MC_S increments by one (step S125). Thereafter, the processing in step S61 and subsequent steps in FIG. 12A is performed again (step S126).

Figure 14A:
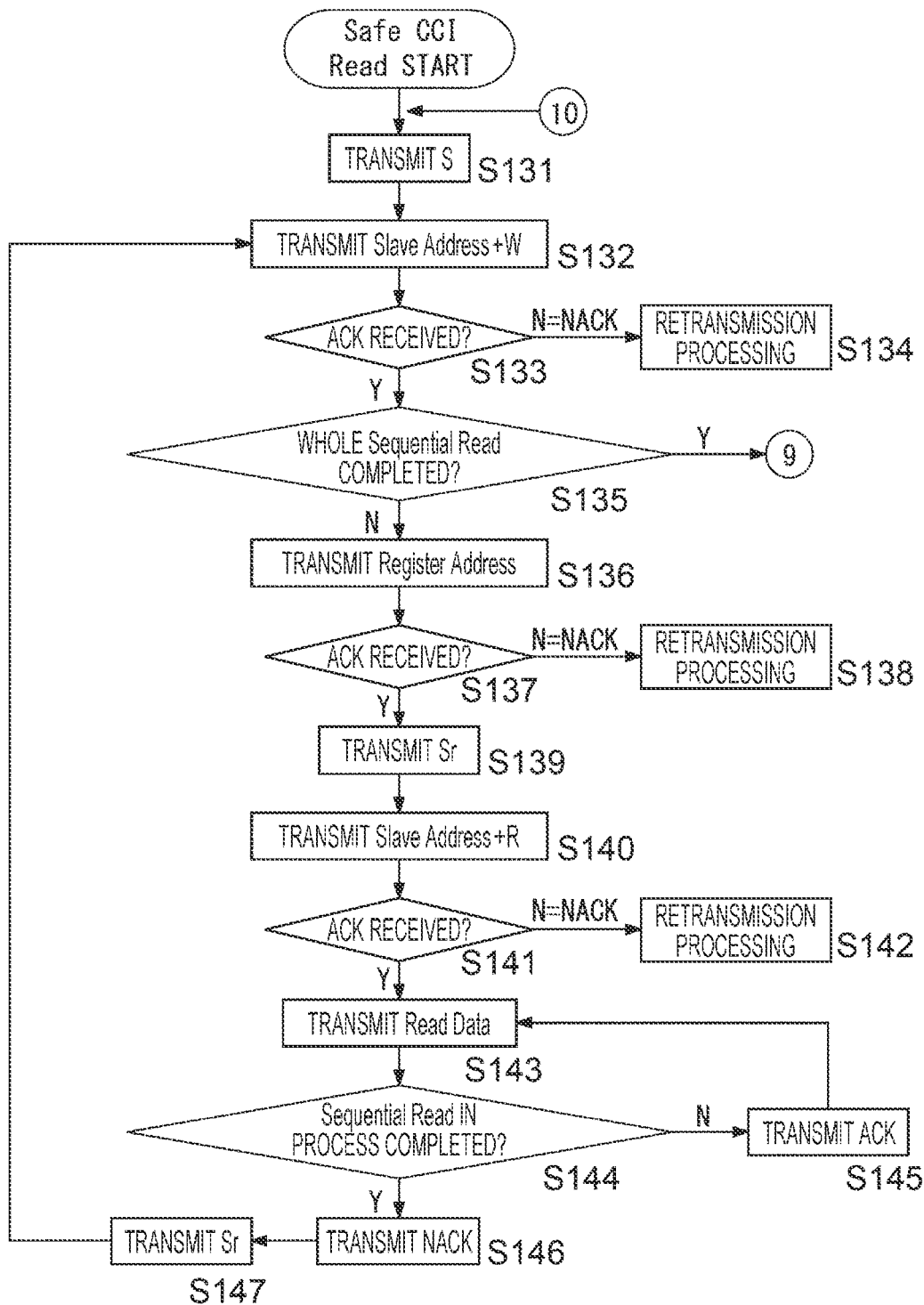
FIG. 14A is a flowchart illustrating a procedure of read processing in the SoC.
Figure 14B:
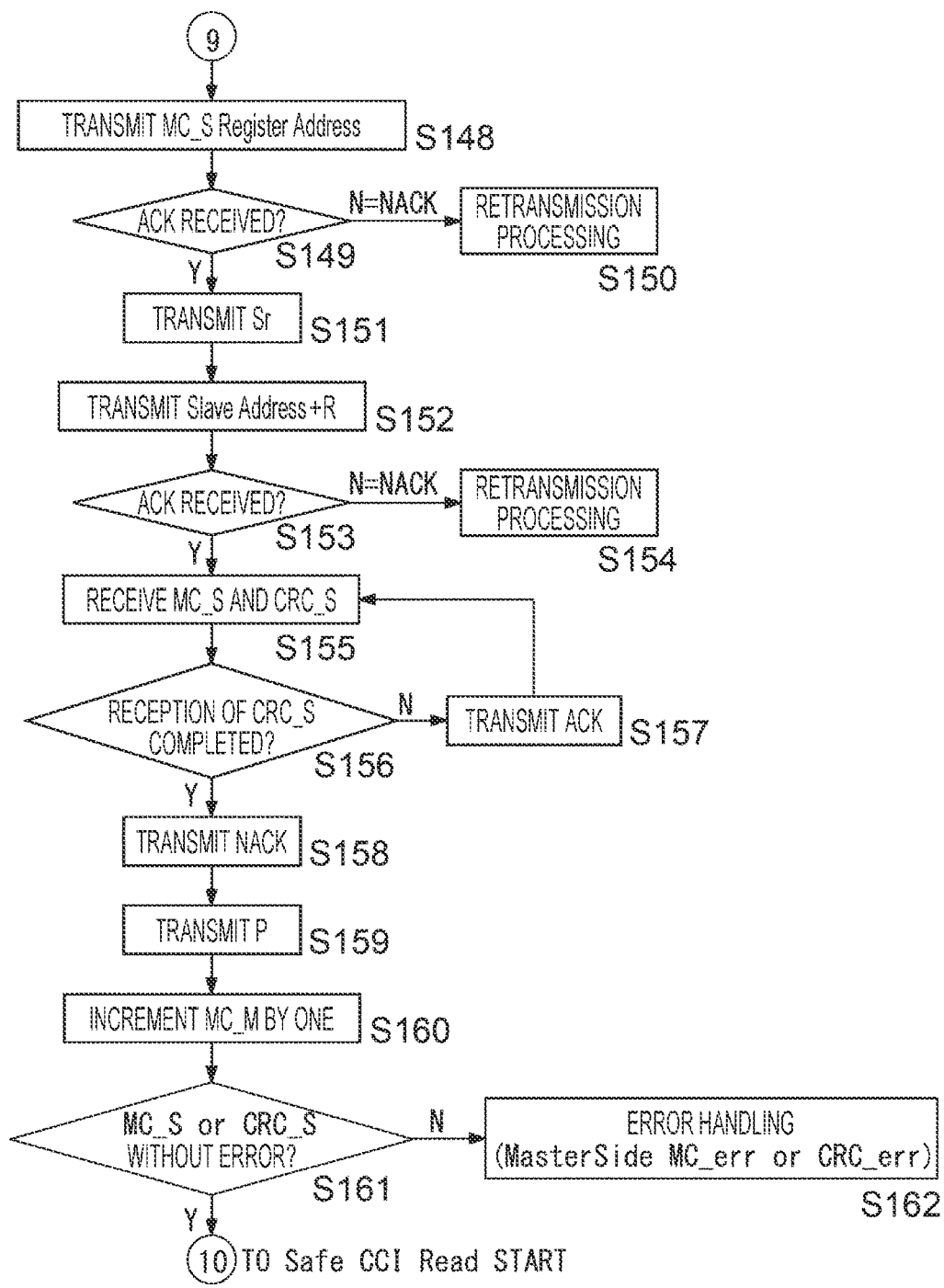
FIG. 14B is a flowchart illustrating a continuation of the flowchart of FIG. 14A.

FIGS. 14A and 14B are flowcharts illustrating a procedure of read processing in the SoC5. In this flowchart, the SoC 5 in the master 1 transmits a protocol of a data read request to the image sensor 11 in the slave 2, and the slave 2 transmits data to the master 1 in response to the protocol.

First, the master 1 transmits the start flag S (step S131). Next, the slave address is transmitted, and then the R/W bit is set to a write bit value (for example, 0) and transmitted (step S132). The write bit value is designated in step S132 in order to designate the head address of the register address to be read, which corresponds to the dummy write described above.

The determination of whether or not the ACK signal is received is then performed (step S133). If the NACK signal is received rather than the ACK signal, retransmission processing illustrated in FIG. 15A described later is performed (step S134).

If the ACK signal is received in step S133, the determination of whether or not the sequential read of all the first operations in the protocol is completed is performed (step S135). If the sequential read is not completed yet, the register address in the first operation is transmitted (step S136). The determination of whether or not the ACK signal is received is then performed (step S137). If the NACK signal is received rather than the ACK signal, retransmission processing illustrated in FIG. 15A described later is performed (step S138).

If the ACK signal is received, a restart flag Sr is transmitted (step S139). Next, the slave address in the first operation is transmitted, and then the R/W bit is set to a read bit value (for example, 1) and transmitted (step S140). The determination of whether or not the ACK signal is received is then performed (step S141). If the NACK signal is received rather than the ACK signal, retransmission processing illustrated in FIG. 15A described later is performed (step S142).

If the ACK signal is received, read data is received (step S143). The determination of whether or not the sequential read is completed is performed (step S144). If the sequential read has not yet been completed, the ACK signal is sent as a reply to the slave 2 (step S145), and the processing in step S143 and subsequent steps is performed.

If the sequential read is determined to be completed in step S144, the NACK signal is sent as a reply to the slave 2 (step S146). The slave 2 can grasp that the sequential read of the master 1 is completed by receiving the NACK signal rather than the ACK signal. Thereafter, the master 1 transmits the restart flag Sr to the slave 2 (step S147), and then the processing in step S132 and subsequent steps is performed.

Figure 15A:
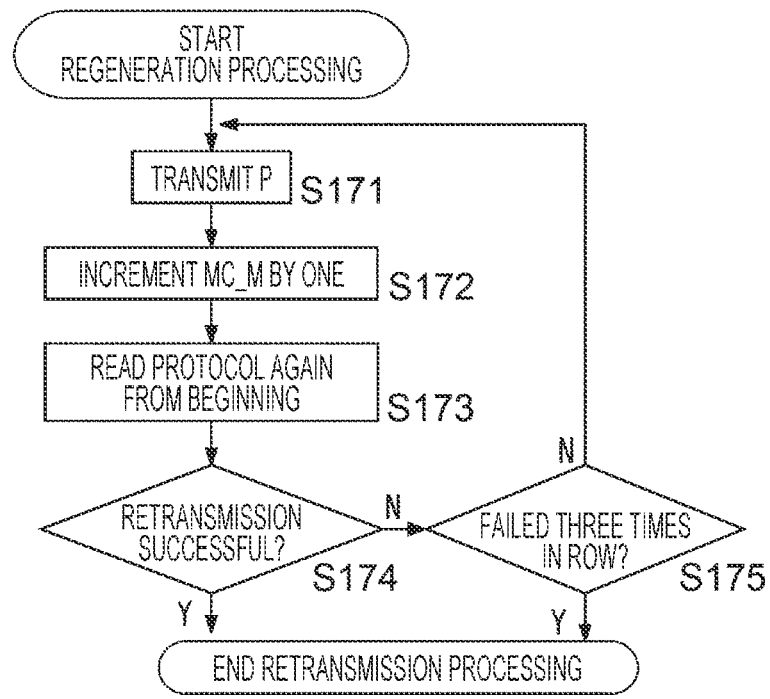
FIG. 15A is a flowchart illustrating detailed processing procedures in steps S134, S138, and S142 in FIG. 14A and steps S150 and S154 in FIG. 14B.

If the sequential read of all the first operations in the protocol is determined to have ended in step S135, the read processing of the second operation in the protocol is performed. First, the register address of the message count value MC_S stored in the register (second storage unit) 43b in the register group 43 of the slave 2 is transmitted (step S148). The determination of whether or not the ACK signal is received from the slave 2 is then performed (step S149). If the NACK signal is received rather than the ACK signal, retransmission processing illustrated in FIG. 15A is performed (step S150).

If the ACK signal is received in step S149, a restart flag Sr is transmitted (step S151). Next, the slave address is transmitted (step S152). Thereafter, the determination of whether or not the ACK signal is received is performed (step S153). If the NACK signal is received rather than the ACK signal, retransmission processing illustrated in FIG. 15A described later is performed (step S154).

If the ACK signal is determined to be received in step S153, the message count value MC_S and the CRC code CRC_S stored in the register (third storage unit) 43c in the slave 2 are received (step S155).

Next, the determination of whether or not the reception of the CRC code CRC_S has been completed is performed (step S156). If the reception has not been completed yet, the ACK signal is sent as a reply to the slave 2 (step S157), and the processing in step S155 and subsequent steps is repeated. If the reception of the CRC code CRC_S is determined to be completed in step S156, the NACK signal is sent as a reply to the slave 2 (step S158). Next, the stop flag P is transmitted (step S159).

Since the read processing of one protocol ends as described above, the message count value MC_M counted by the MC_M generation unit 26 increments by one (step S160). Next, the determination of whether or not the message count value MC_S from the slave 2 matches MC_M and the CRC code CRC_S matches CRC_M is performed (step S161). If they match, the processing in step S131 and subsequent steps in FIG. 14A is repeated. If at least one of them is determined to be mismatched in step S161, error handling in FIG. 15B described later is performed (step S162). That is, in step S162, if at least one of the master side error detection signal MC_err or the master side error detection signal CRC_err is output, the error handling of FIG. 15B is performed.

FIG. 15A is a flowchart illustrating detailed processing procedures in steps S134, S138, and S142 in FIG. 14A and steps S150 and S154 in FIG. 14B. The stop flag P is first transmitted (step S171). Next, the message count increments by one (step S172). Next, the processing is performed again from the beginning of the protocol (step S173). That is, the processing in S131 and subsequent steps in FIG. 14A is performed again. The determination of whether or not the retransmission processing is successful is performed (step S174). If the retransmission is successful, the retransmission processing is ended, and if the retransmission is not successful, the determination of whether or not the retransmission processing has failed three times in a row is performed (step S175). If three consecutive failures occur, the retransmission process is ended, and if not yet failed up to three times, the processing in step S171 and subsequent steps is repeated. In the case of three consecutive failures, the processing to be performed after completion of the retransmission processing can be optionally determined. In one example, the processing of reading the error flag of the image sensor 11 in the slave 2, restarting the retransmission processing after a lapse of a predetermined time, displaying a warning, or the like can be performed.

Figure 15B:
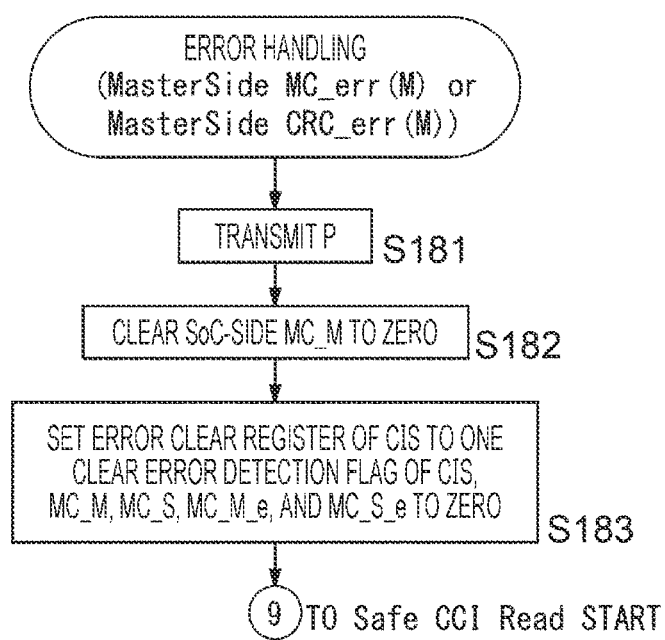
FIG. 15B is a flowchart illustrating a detailed processing procedure of error handling upon outputting a master side error detection signal MC_err or CRC_err in step S162 in FIG. 14B.

FIG. 15B is a flowchart illustrating a detailed processing procedure of error handling upon outputting a master side error detection signal MC_err or CRC_err in step S162 in FIG. 14B. The stop flag P is first transmitted to the slave 2 (step S181). Next, the message count value MC_M counted by the SoC 5 in the master 1 is cleared to zero (step S182). Next, the error clear register of the register (fourth storage unit) 43d of the image sensor 11 in the slave 2 is set to 1 (step S183). As a result, the message count values MC_M and MC_S of the register (second storage unit) 43b and the error flags MC_M_err and MC_S_err of the register (fourth storage unit) 43d are cleared. Thereafter, the processing in step S131 and subsequent steps in FIG. 14A is performed again (step S184).

As described above, in the present embodiment, when a write protocol is transmitted from the SoC 5 in the master 1 to the image sensor 11 in the slave 2, an operation (second operation) including the message count value MC_M counted by the master 1 and the CRC code CRC_M generated by the master 1 is transmitted in a data format of a CCI-compliant operation. At that time, in the second operation, the slave address, the register address of the register (second storage unit) 43b, the message count value MC_M, and the CRC code CRC_M are arranged in order after the restart flag, and the stop flag P is arranged at the end. Therefore, in the slave 2, the message count value and the CRC code included in the received protocol can be distinguished from normal write data, and can be stored in the register address designated by the master 1 without errors.

Furthermore, in the present embodiment, the MC_S generation unit 44 and the CRC_S generation unit 45 are provided inside the slave 2, and the message count value and the CRC code included in the second operation in the protocol transmitted from the master 1 are compared. If the message count value and the CRC code do not match, an error detection signal is output, and a NACK signal is sent as a reply to the master 1. By receiving the NACK signal, the master 1 can quickly detect that an error has occurred in the message count value or the CRC code, and can perform protocol retransmission processing.

Further, in the present embodiment, the read protocol including the read request of the message count value MC_S counted by the slave 2 and the CRC code CRC_S generated by the slave 2 can be transmitted from the master 1 to the slave 2 in accordance with the CCI. According to this protocol, the message count value MC_S transmitted from the slave 2 is compared with the message count value MC_M counted in the master 1. Similarly, the CRC code CRC_S transmitted from the slave 2 is compared with the CRC code CRC_M generated in the master 1. As a result, the master 1 can quickly determine whether or not there is an error in the message count value and the CRC code, and can improve the reliability of the I2C/I3C communication.

Additionally, the present technology may also be configured as below.

(1) A communication device including:
a communication unit configured to communicate with a communication partner device in accordance with a protocol,
in which the protocol has at least one first operation and a second operation,
the first operation includes identification information of the communication partner device, write-instructing information, identification information of a first storage unit of the communication partner device, and data to be written in the first storage unit, and
the second operation is placed following the at least one first operation and includes identification information of the communication partner device, write-instructing information, identification information of a second storage unit of the communication partner device, information indicating a number of the protocols, and a cyclic redundancy check (CRC) code used to detect an error in the protocol, the second storage unit being configured to store the CRC code and the information indicating the number of the protocols.

(2) The communication device according to (1), in which the identification information of the communication partner device included in the first operation is identical to the identification information of the communication partner device included in the second operation.

(3) The communication device according to (1), in which the data to be written to the first storage unit in the first operation has a head position equal to a head position of the information indicating the number of the protocols in the second operation, and the CRC code is placed following the information indicating the number of the protocols.

(4) The communication device according to any one of (1) to (3), further including:
a counter configured to count the number of the protocols to be transmitted to the communication partner device; and
a CRC code generation unit configured to generate the CRC code on the basis of the respective pieces of information included in the at least one first operation and the respective pieces of information placed preceding the CRC code in the second operation.

(5) The communication device according to any one of (1) to (4), in which the protocol includes a start flag placed at a beginning position of the leading first operation, a restart flag placed at a beginning position of the subsequent first operations, a restart flag placed at a beginning position of the second operation, and a stop flag placed at a tail end of the second operation.

(6) The communication device according to any one of (1) to (5), further including: a retransmission processing unit configured to perform processing of receiving an acknowledgment signal or a signal of logical inversion to the acknowledgment signal, transmitting a stop flag, and retransmitting the protocol from a head position of the protocol, in which the acknowledgment signal or the logical inversion signal is received from the communication partner device each time the respective pieces of information in the first operation and the second operation are transmitted to the communication partner device, the stop flag is transmitted to the communication partner device in a case of receiving the logical inversion signal, and the retransmission is performed after incrementing the information indicating the number of the protocols.

(7) The communication device according to any one of (1) to (5), further including: a retransmission processing unit configured to perform processing of receiving an acknowledgment signal or a signal of logical inversion to the acknowledgment signal and retransmitting the protocol from a head position of the protocol, in which the acknowledgment signal or the logical inversion signal is received from the communication partner device each time the respective pieces of information in the first operation and the second operation are transmitted to the communication partner device, and the retransmission is performed after incrementing the information indicating the number of the protocols in a case of receiving the logical inversion signal.

(8) The communication device according to any one of (1) to (5), further including:
a first error handling unit configured to initialize the information indicating the number of the protocols and instruct the communication partner device to initialize the information indicating the number of the protocols and an error flag held by the communication partner device in a case of receiving a signal of logical inversion to an acknowledgment signal from the communication partner device after transmission of the information indicating the number of the protocols in the second operation, the number of the protocols being counted by the communication partner device; and
a second error handling unit configured to initialize the information indicating the number of the protocols and instruct the communication partner device to initialize the information indicating the number of the protocols and the error flag held by the communication partner device in a case of receiving the signal of logical inversion to the acknowledgment signal from the communication partner device after transmission of the CRC code in the second operation, the number of the protocols being counted by the communication partner device.

(9) The communication device according to any one of (1) to (8), in which the communication partner device is an image capturing device, and the first operation of the protocol includes data used to control the image capturing device.

(10) A communication device including:

a communication unit configured to communicate with a communication partner device in accordance with a protocol including at least one first operation and a second operation;

a first storage unit configured to store data included in the first operation;

a second storage unit configured to store information indicating a number of the protocols included in the second operation and a first CRC code used to detect an error in the protocol;

a counter configured to count the number of the protocols received by the communication unit;

a CRC code generation unit configured to generate a second CRC code on the basis of respective pieces of information in the first operation and the second operation placed preceding the first CRC code in the protocol received by the communication unit;

a first comparator configured to compare the information indicating the number of the protocols included in the second operation with the number of the protocols counted by the counter;

a second comparator configured to compare the first CRC code with the second CRC code;

a first error detection unit configured to output a first error detection signal in a case of no match of results obtained by comparison in the first comparator; and a second error detection unit configured to output a second error detection signal in a case of no match of results obtained by comparison in the second comparator.

(11) The communication device according to (10), further including: a write processing unit configured to control the first storage unit in such a way the first storage unit stores the data included in the first operation in a case where the first operation includes identification information of the communication device, the first operation includes identification information of the first storage unit, and the first operation includes write-instructing information, in which the write processing unit controls the second storage unit in such a way that the second storage unit stores the information indicating the number of the protocols and the first CRC code, which are included in the second operation, in a case where the second operation includes identification information of the second storage unit.

(12) The communication device according to (10) or (11), further including:

a third storage unit configured to store the number counted by the counter and the second CRC code generated by the CRC code generation unit; and a read processing unit configured to perform control of transmitting via the communication unit the number counted by the counter and the second CRC code generated by the CRC code generation unit, which are stored in the third storage unit, in a case of including read-instructing information in the second operation in the protocol and including identification information of the third storage unit in the second operation.

(13) The communication device according to any one of (10) to (12), further including:

an image capturing unit configured to output an image signal, in which the communication partner device is a control device that controls the image capturing unit and performs image processing on the image signal.

(14) A communication device including:

a communication unit configured to communicate with a communication partner device in accordance with a protocol including read-requesting information, in which the protocol has at least one first operation and a second operation, the first operation includes first read-requesting information and information read from a first storage unit included in the communication partner device in response to the first read-requesting information and transmitted from the communication partner device, the first read-requesting information includes identification information of the communication partner device, write-instructing information, identification information of the first storage unit, the identification of the communication partner device, and read-instructing information, the second operation includes second read-requesting information and information read from a second storage unit in response to the second read-requesting information and transmitted from the communication partner device, and the second read-requesting information includes the identification information of the communication partner device, the write-instructing information, identification information of the second storage unit, the identification information of the communication partner device, the read-instructing information, the second storage unit being configured to store information indicating a number of the protocols counted by the communication partner device and a CRC code used to detect an error of the protocol, the CRC code being generated by the communication partner device.

(15) The communication device according to (14), in which the identification information of the communication partner device included in the first operation is identical to the identification information of the communication partner device included in the second operation.

(16) The communication device according to (14) or (15), in which the protocol includes a start flag placed at a beginning position of the leading first operation, a restart flag placed at a beginning position of the subsequent first operations, a restart flag placed at a beginning position of the second operation, and a stop flag placed at a tail end of the second operation.

(17) The communication device according to (16), further including:

a counter configured to count the number of the protocols transmitted to the communication partner device;

a CRC code generation unit configured to generate a CRC code on the basis of respective pieces of information included in the respective protocols transmitted to the communication partner device;

a first comparator configured to compare the information indicating the number of the protocols transmitted from the communication partner device with the number counted by the counter;

a second comparator configured to compare the CRC code transmitted from the communication partner device with the CRC code generated by the CRC code generation unit; and an error handling unit configured to perform error handling in a case of no match of results obtained by comparison in at least one of the first comparator or the second comparator.

(18) The communication device according to (17), in which the error handling unit initializes a count value of the counter and instructs the communication partner device to clear the information indicating the number of the protocols being counted by the communication partner device and an error detection flag to zero.

(19) The communication device according to (17) or (18), further including: a retransmission processing unit configured to perform retransmission processing of the protocol after counting up the number of the protocols counted by the counter in a case of receiving a signal of logical inversion to an acknowledgment signal from the communication partner device, the retransmission being performed in at least one of a case of transmitting the identification information of the communication partner device included in the first operation, a case of transmitting the identification information of the first storage unit of the communication partner device included in the first operation, a case of transmitting the identification information of the communication partner device included in the first operation or the second operation after transmission of the restart flag to the communication partner device, or a case of transmitting the identification information of the second storage unit in the second operation.

(20) A communication system including:
a first communication device; and
a second communication device,
in which the first communication device has a first communication unit configured to communicate with the second communication device in accordance with a first protocol,
the first protocol includes at least one first operation and a second operation,
the first operation includes identification information of the second communication device, identification information of a first storage unit included in the second communication device, and data to be written in the first storage unit,
the second operation is placed following the at least one first operation and includes the identification information of the second communication device, identification information of a second storage unit included in the second communication device, information indicating a number of the first protocols, and a cyclic redundancy check (CRC) code used to detect an error in the first protocol, the second storage unit being configured to store the CRC code and the information indicating the number of the first protocols,
in which the second communication device has
a second communication unit configured to communicate with the first communication device in accordance with the first protocol;
a first storage unit configured to store data included in the first operation;
a second storage unit configured to store the information indicating the number of the first protocols included in the second operation and a first CRC code used to detect the error in the first protocol;
a counter configured to count the number of the first protocols received by the second communication unit;
a CRC code generation unit configured to generate a second CRC code on the basis of respective pieces of information in the first operation and the second operation placed preceding the first CRC code in the first protocol received by the second communication unit;
a first comparator configured to compare the information indicating the number of the first protocols included in the second operation with the number counted by the counter;
a second comparator configured to compare the first CRC code with the second CRC code;
a first error detection unit configured to output a first error detection signal in a case of no match of results obtained by comparison in the first comparator; and
a second error detection unit configured to output a second error detection signal in a case of no match of results obtained by comparison in the second comparator.

(21) The communication system according to (20), in which
the first communication device transmits a second protocol including read-requesting information to the second communication device,
the second communication device has a third storage unit configured to store the number counted by the counter and the second CRC code generated by the CRC code generation unit,
the second protocol has at least one third operation and a fourth operation,
the third operation includes first read-requesting information and information read from the first storage unit in response to the first read-requesting information and transmitted from the second communication device, the first read-requesting information includes identification information of the second communication device, write-instructing information, identification information of the first storage unit included in the second communication device, the identification information of the second communication device, and read-instructing information, and
the fourth operation includes second read-requesting information and information read from the third storage unit in response to the second read-requesting information and transmitted from the second communication device, and the second read-requesting information includes the identification information of the second communication device, the write-instructing information, identification information of the third storage unit, the identification information of the second communication device, and the read-instructing information.

(22) The communication system according to (21), further including:
a third communication device configured to perform serial communication with the first communication device; and
a fourth communication device configured to perform serial communication with the second communication device and perform serial communication with the third communication device,
in which the third communication device and the fourth communication device relay the first protocol and the second protocol without modification.

(23) The communication system according to (22), in which
the first communication device and the third communication device perform inter-integrated circuit (I2C) or improved inter-integrated circuit (I3C) communication, and
the second communication device and the fourth communication device perform I2C or I3C communication.

The mode for carrying out the present disclosure is not limited to the respective embodiments described above but also includes various modifications that can be conceived by those skilled in the art, and the effects of the embodiments of the present disclosure are not limited to the description above. In other words, various additions, changes, and partial deletions are possible without departing from the conceptual idea and intention of the present disclosure derived from the scope of the claims or the equivalents thereof.

REFERENCE SIGNS LIST

1 Master
2 Slave
3 Communication system
4 Cable
5 SoC
6 Deserializer
7 First MUX
8 First receiver
9 First transmitter
10 First LINK unit
11 Image sensor
12 Serializer
13 Second MUX
14 Second receiver
15 Second transmitter
16 Second LINK unit
21 Communication unit
22 CCI unit
23 Register group
24 Processor
25 RAM
26 MC_M generation unit
27 CRC_M generation unit
28 Write processing unit
29 Read processing unit
30 Slave side MC error detection unit
30a NACK detection unit upon MC_M transmission
30b Slave side MC error output unit
31 Slave side CRC error detection unit
31a NACK detection unit upon CRC_M transmission
31b Slave side CRC error output unit
32 Master side MC error detection unit
32a First comparator
32b Master side MC error output unit
33 Master side CRC error detection unit
33a Second comparator
33b Master side CRC error output unit
34 Communication unit
35 CCI unit
35a Write processing unit
35b Read processing unit
36 FIFO unit
37 AAL processing unit
38 A-PHY processing unit
41 Communication unit
42 CCI unit
43 Register group
43a Register (first storage unit)
43b Register (second storage unit)
43c Register (third storage unit)
43d Register (fourth storage unit)
44 MC_S generation unit
45 CRC_S generation unit
46 First comparator
47 Second comparator
48 Slave side MC error detection unit
49 Slave side CRC error detection unit
50 Write processing unit
51 Read processing unit
52 Communication unit
53 CCI unit
54 FIFO unit
55 AAL processing unit
56 A-PHY processing unit
57 Write processing unit
58 Read processing unit

The invention claimed is:

1. A communication device comprising:
a communication unit configured to communicate with a communication partner device in accordance with a protocol including a sequence of operations, the sequence of operations including a first operation and a second operation following the first operation, wherein:
the first operation includes identification information of the communication partner device, write-instructing information, identification information of a first memory of the communication partner device, and data to be written in the first memory, and
the second operation includes identification information of the communication partner device, write-instructing information, identification information of a second memory of the communication partner device, information indicating a number of the protocols to be transmitted to the communication partner device, and a cyclic redundancy check (CRC) code used to detect an error in the first operation, the second memory being configured to store the CRC code and the information indicating the number of the protocols to be transmitted to the communication partner device.

2. The communication device according to claim 1, wherein the identification information of the communication partner device included in the first operation is identical to the identification information of the communication partner device included in the second operation.

3. The communication device according to claim 1, wherein the data to be written to the first memory in the first operation has a head position equal to a head position of the information indicating the number of the protocols in the second operation, and the CRC code is placed following the information indicating the number of the protocols.

4. The communication device according to claim 1, further comprising:
a counter configured to count the number of the protocols to be transmitted to the communication partner device; and
a CRC code generation unit configured to generate the CRC code on a basis of respective pieces of information included in the first operation and respective pieces of information placed preceding the CRC code in the second operation.

5. The communication device according to claim 1, wherein the protocol includes a start flag placed at a beginning position of a leading first operation, a restart flag placed at a beginning position of a subsequent first operation, a restart flag placed at a beginning position of the second operation, and a stop flag placed at a tail end of the second operation.

6. The communication device according to claim 1, further comprising: a retransmission processing unit configured to perform processing of receiving an acknowledgment signal or a signal of logical inversion to the acknowledgment signal, transmitting a stop flag, and retransmitting the protocol from a head position of the protocol, wherein the acknowledgment signal or the logical inversion signal is received from the communication partner device each time respective pieces of information in the first operation and the second operation are transmitted to the communication partner device, the stop flag is transmitted to the communication partner device in a case of receiving the logical inversion signal, and the retransmission is performed after incrementing the information indicating the number of the protocols.

7. The communication device according to claim 1, further comprising: a retransmission processing unit configured to perform processing of receiving an acknowledgment signal or a signal of logical inversion to the acknowledgment signal and retransmitting the protocol from a head position of the protocol, wherein the acknowledgment signal or the logical inversion signal is received from the communication partner device each time respective pieces of information in the first operation and the second operation are transmitted to the communication partner device, and the retransmission is performed after incrementing the information indicating the number of the protocols in a case of receiving the logical inversion signal.

8. The communication device according to claim 1, further comprising:
  a first error handling unit configured to initialize the information indicating the number of the protocols and instruct the communication partner device to initialize the information indicating the number of the protocols and an error flag held by the communication partner device in a case of receiving a signal of logical inversion to an acknowledgment signal from the communication partner device after transmission of the information indicating the number of the protocols in the second operation, the number of the protocols being counted by the communication partner device; and
  a second error handling unit configured to initialize the information indicating the number of the protocols and instruct the communication partner device to initialize the information indicating the number of the protocols and the error flag held by the communication partner device in a case of receiving the signal of logical inversion to the acknowledgment signal from the communication partner device after transmission of the CRC code in the second operation, the number of the protocols being counted by the communication partner device.

9. The communication device according to claim 1, wherein
  the communication partner device is an image capturing device, and
  the first operation of the protocol includes data used to control the image capturing device.

10. A communication device comprising:
  a communication unit configured to communicate with a communication partner device in accordance with a protocol including read-requesting information,
  wherein the protocol includes a first operation and a second operation,
  wherein the first operation includes first read-requesting information and first read information, the first read-requesting information includes identification information of the communication partner device, write-instructing information, identification information of a first memory of the communication partner device, the identification of the communication partner device, and read-instructing information,
  wherein the communication partner device is configured to read the first read information from the first memory in response to receiving the first read-requesting information from the communication unit,
  wherein the communication partner device is configured to perform a write operation to the first memory in response to receiving the write-instructing information from the communication unit,
  wherein the second operation includes second read-requesting information and second read information,
  wherein the communication device is configured to read the second read information from a second memory of the communication partner device in response to receiving the second read- requesting information from the communication unit,
  wherein the second read-requesting information includes the identification information of the communication partner device, the write-instructing information, identification information of the second memory, the identification information of the communication partner device, the read-instructing information, and
  wherein the second memory is configured to store information indicating a number of the protocols counted by the communication partner device and a CRC code used to detect an error of the protocol, the CRC code being generated by the communication partner device.

11. The communication device according to claim 10, wherein the identification information of the communication partner device included in the first operation is identical to the identification information of the communication partner device included in the second operation.

12. The communication device according to claim 10, wherein the protocol includes a start flag placed at a beginning position a leading first operation, a restart flag placed at a beginning position of a subsequent first operation, a restart flag placed at a beginning position of the second operation, and a stop flag placed at a tail end of the second operation.

13. The communication device according to claim 12, further comprising:
  a counter configured to count the number of the protocols transmitted to the communication partner device;
  a CRC code generation unit configured to generate a CRC code on a basis of respective pieces of information included in the respective protocols transmitted to the communication partner device;
  a first comparator configured to compare the information indicating the number of the protocols transmitted from the communication partner device with the number counted by the counter;
  a second comparator configured to compare the CRC code transmitted from the communication partner device with the CRC code generated by the CRC code generation unit; and
  an error handling unit configured to perform error handling in a case of no match of results obtained by comparison in at least one of the first comparator or the second comparator.

14. The communication device according to claim 13, wherein the error handling unit initializes a count value of the counter and instructs the communication partner device to clear the information indicating the number of the protocols being counted by the communication partner device and an error detection flag to zero.

15. The communication device according to claim 13, further comprising: a retransmission processing unit configured to perform retransmission processing of the protocol after counting up the number of the protocols counted by the counter in a case of receiving a signal of logical inversion to an acknowledgment signal from the communication partner device, the retransmission being performed in at least one of a case of transmitting the identification information of the communication partner device included in the first operation, a case of transmitting the identification information of the first memory of the communication partner device included in the first operation, a case of transmitting the identification information of the communication partner device included in the first operation or the second operation after transmission of the restart flag to the communication partner device, or a case of transmitting the identification information of the second memory in the second operation.

* * * * *